US012706122B2

(12) United States Patent
Katekar et al.

(10) Patent No.: US 12,706,122 B2
(45) Date of Patent: Aug. 11, 2026

(54) SYSTEMS AND METHODS FOR SYNCHRONIZING VISUAL CONTENT TO AUDIO

(71) Applicant: Canva Pty Ltd, Surry Hills (AU)

(72) Inventors: Rowan James Katekar, Randwick (AU); Clarence Feng, Sydney (AU); Julia Leinmore, Mount Pleasant (AU); An Nguyen, Sydney (AU); Johanna Somerville, Sydney (AU); Liam Rayner, Warragul (AU)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 19/045,656

(22) Filed: Feb. 5, 2025

(65) Prior Publication Data

US 2025/0259655 A1 Aug. 14, 2025

(30) Foreign Application Priority Data

Feb. 9, 2024 (AU) ................................ 2024200856

(51) Int. Cl.
*G06F 3/0481* (2022.01)
*G06F 3/04842* (2022.01)
*G11B 27/34* (2006.01)

(52) U.S. Cl.
CPC ............ *G11B 27/34* (2013.01); *G06F 3/0481* (2013.01); *G06F 3/04842* (2013.01); *G06F 2203/04806* (2013.01)

(58) Field of Classification Search
CPC ... G11B 27/34; G06F 3/0481; G06F 3/04842; G06F 2203/04806
See application file for complete search history.

(56) References Cited

U.S. PATENT DOCUMENTS 8,543,921 B2 * 9/2013 Langmacher ......... G06F 3/0484 386/282
11,132,993 B1 * 9/2021 McDaniel ........... G10L 15/1807
(Continued)

OTHER PUBLICATIONS

Fastest Way to Edit to the Beat | Adobe Premiere Pro (No Markers), https://www.youtube.com/watch?v=akADwTqnw3E [Viewed on internet on Apr. 30, 2024], Published on Aug. 5, 2020, pp. 1-15.
(Continued)

*Primary Examiner* — Phenuel S Salomon
(74) *Attorney, Agent, or Firm* — GrowIP Law Group LLC

(57) ABSTRACT

Systems and methods for displaying beat markers in a visual production user interface are disclosed. The method includes: displaying, on a display, the visual production user interface including a timeline region, the timeline region including: an audio timeline including a waveform representation of an audio element associated with a visual production; determining a zoom level of the timeline region at a first time; in response to determining that the zoom level of the timeline region is above a threshold zoom level at the first time, displaying downbeat and non-downbeat markers in the audio timeline, the downbeat and non-downbeat markers indicating positions of downbeats and non-downbeats respectively in the audio element; and in response to determining that the zoom level of the timeline region is below a threshold zoom level at the first time, displaying downbeat markers in the audio timeline without displaying non-downbeat markers.

21 Claims, 11 Drawing Sheets

(56) References Cited

U.S. PATENT DOCUMENTS

| | | | | |
|---|---|---|---|---|
| 2010/0281378 | A1* | 11/2010 | Pendergast | G11B 27/34 715/731 |
| 2010/0281379 | A1* | 11/2010 | Meaney | G11B 27/031 715/723 |
| 2012/0210220 | A1* | 8/2012 | Pendergast | G06F 3/0482 715/716 |
| 2013/0073964 | A1* | 3/2013 | Meaney | G11B 27/031 715/716 |
| 2013/0336379 | A1 | 12/2013 | Erofeev et al. | |
| 2014/0201631 | A1* | 7/2014 | Pornprasitsakul | G11B 27/031 715/716 |
| 2019/0104259 | A1* | 4/2019 | Angquist | G11B 27/34 |
| 2022/0076026 | A1* | 3/2022 | Walker | G06V 40/161 |
| 2022/0076707 | A1* | 3/2022 | Walker | G06V 20/41 |
| 2022/0335973 | A1* | 10/2022 | Evans | G11B 27/031 |

OTHER PUBLICATIONS

Harsit, M., 'Measures, Downbeats, Bars and Phrases,' https://web.archive.org/web/20231015193242/https://github.com/mixxxdj/mixxx/wiki/Measures-Downbeats-Bars-And-Phrases [retrieved from internet on Apr. 30, 2024], published on Oct. 15, 2023 as per Wayback Machine, pp. 1-12.

* cited by examiner

SYSTEMS AND METHODS FOR SYNCHRONIZING VISUAL CONTENT TO AUDIO

CROSS-REFERENCE TO RELATED APPLICATION

This application is a U.S. Non-Provisional application that claims priority to Australian Patent Application No. 2024200856, filed Feb. 9, 2024, which is hereby incorporated by reference in its entirety.

TECHNICAL FIELD

The present disclosure is directed to systems and methods for creating and/or editing digital productions and in particular to synchronizing visual content in digital productions to beats in an audio track.

BACKGROUND

Various tools for creating and editing digital visual productions exist. Generally speaking, such tools can be used to create a visual production by adding various content elements—for example video footage, photos, graphic overlays, audio tracks and/or effects—and setting the timing for when those content elements are played or displayed.

BRIEF DESCRIPTION OF THE DRAWINGS

Preferred embodiments of the invention will be described, by way of examples only, with reference to the accompanying representations, wherein.

DETAILED DESCRIPTION

In the following description, numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

The present disclosure is generally concerned with creating and editing digital visual productions (which will also be referred to simply as 'productions' for short).

As described above, tools for creating and editing visual productions are known. The user interfaces (UIs) of existing tools, however, can be complex to understand and interact with. In addition, know digital visual production tools may not provide users with the ability to fine-tune editing of the visual productions at the level of individual components.

Figure 1:
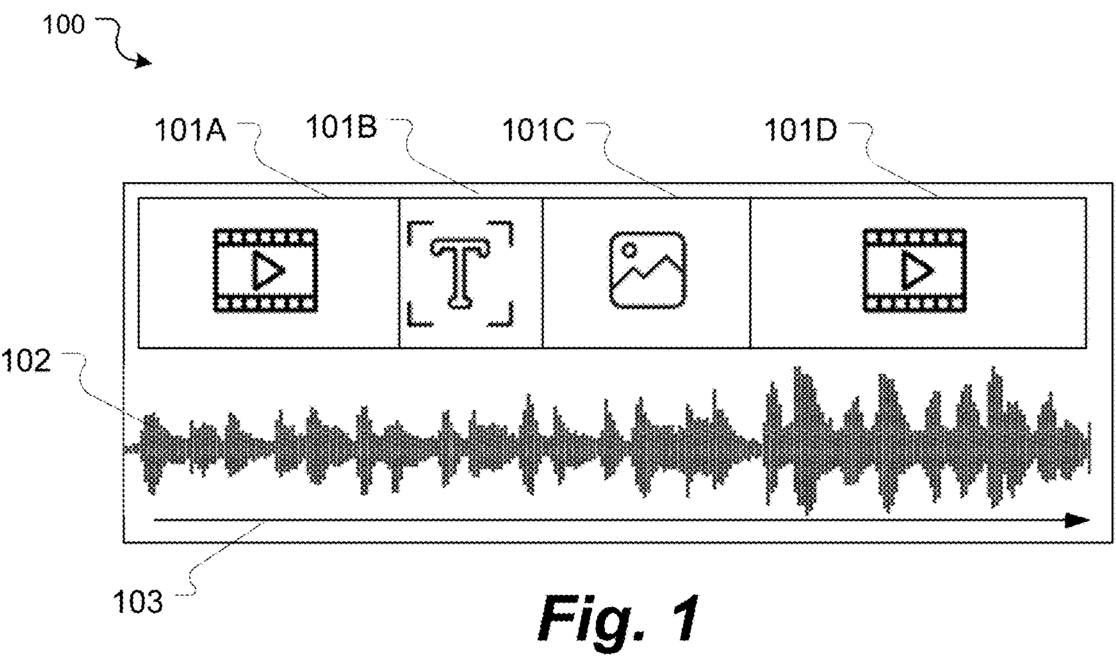
FIG. 1 shows a conventional visual production timeline.

FIG. 1 provides an example of a known type of digital visual production timeline UI 100. Timeline UI 100 represents a visual production, which includes four visual content elements (101A, 101B, 101C, and 101D) and an audio element 102.

In UI 100, a timeline 103 is displayed representing the duration (or part of the duration) of the visual production. Each video element 101A-101D of the visual production is provided along the timeline to show the order in which the video elements will be played. Further, the width of the video elements indicates the duration of the video element along the timeline—video elements with a smaller width have a shorter playtime (e.g., 101B and 101C) and videos with a larger width have a longer playtime (e.g., 101A and 101D). In this example, the audio element 102 is shown as a waveform along the timeline. It is usually at least a portion of an audio track that is played during the duration of the visual production simultaneously with the video elements.

Some tools that provide such UIs 100 also identify beats in the audio element 102 and display beat markers for downbeats in the audio element 102. In music, a beat is the basic unit of time. Beats are generally grouped together in bars, where a bar is given a time signature denoting the pattern of stressed and unstressed beats. The first beat of the bar is termed the downbeat. In this disclosure, the other beats of the bar are termed non-downbeats and the term beats is used to refer to both downbeats and non-downbeats.

By displaying downbeats (not shown) in UI 100, some known visual production tools allow users to manually synchronize transitions between different video elements to the downbeats of the audio element. These or other visual production tools can also automatically synchronize the transitions between video elements to the downbeats identified in the audio element.

However, such known visual production tools do not provide fine grain control over individual elements—often making it difficult for users to precisely align transitions to the beats in the music, which can result in undesirable video productions. Further, although some tools allow users to manually add beats to the audio element, this can be difficult for novice users or users who lack musical knowledge.

The present disclosure provides alternative user interfaces, user interface interactions, and processing techniques for creating and editing digital visual productions. In particular, aspects of the present disclosure provide an improved visual production tool that not only automatically identifies downbeats in an audio track, but also automatically identifies non-downbeats in the audio track accurately and more efficiently than known tools. Further, the improved UI reduces cognitive burden on users and allows users to control manual synchronization of video element transitions to beats in an audio element more effectively and accurately. As used herein, the term audio track is used to refer to a complete audio file, whereas the term audio element is used to refer to the portion of the audio track that is associated with a visual production.

In general, the systems and methods disclosed herein include a beat analysis system that processes audio elements to obtain beat metadata and an editing module that allows users to invoke the beat analysis system and consumes the beat metadata to surface additional controls to the user in a visual production UI.

The analysis system generates beat metadata by using computational graphs and neural networks for all stages of the audio signal processing—thereby reducing complexity and utilizing the speed of a graph engine to generate beta metadata accurately and quickly.

The visual production UI of the present disclosure allows users to adjust the timescale of the displayed audio element. At a default zoom level, the visual production UI displays downbeats of the audio element, but at higher zoom levels, it displays additional beats in the audio element. This way, a user can not only synchronize a video transition to a downbeat in the audio element, but if required, also synchronize a video transition to any non-downbeats in the audio element. Further, by conditionally displaying the additional beats at higher zoom levels and hiding the additional beats at lower zoom levels, the presently disclosed system does not unnecessarily clutter the UI display at reduced timescales and prevents the user from erroneously synchronizing a transition to the wrong beat at reduced timescales, but also provides the user with the added ability to synchronize with a non-down beat if required (by displaying these at a increased timescales).

Further still, in some embodiments, the visual production UI of the present disclosure allows users to precisely synchronize the video elements to a give beat with manual control. To this end, the presently disclosed system introduces snap regions associated with beats of the audio element. When a user drags an edge of a video element into a snap region, the position of the edge of the video element is locked to the corresponding beat until the edge is dragged out of the snap region. If the user drops the drag at any point in the snap region, the edge of the video element is automatically adjusted to align or synchronize with the beat in that snap region even though the user may not have perfectly aligned the edge of the video element with the audio beat.

Finally, the visual production system disclosed herein can automatically modify the timing of multiple video elements across the visual production so that transitions between all the video elements are automatically synchronized with downbeats or non-downbeats in the audio element.

These and other aspects of the visual production system and UI will be described in detail in the following sections with reference to FIGS. 2-16.

Figure 2:
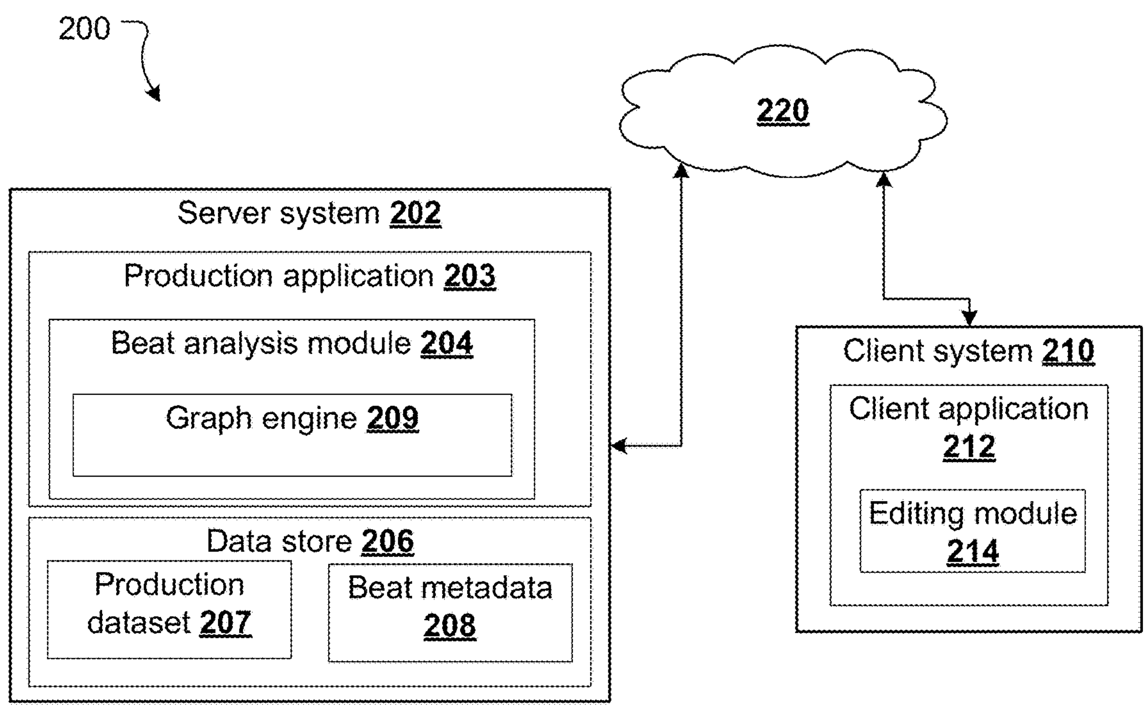
FIG. 2 is a block diagram illustrating an example environment in which features of the present disclosure can be implemented.

FIG. 2 depicts one example of a networked environment 200 in which the various operations and techniques described herein can be performed.

Networked environment 200 includes a visual production server system 202 (server system 202 for short) and a client system 210 that are interconnected via a communications network 220 (e.g. the Internet). While a single client system 210 is illustrated and described, server system 202 will typically serve multiple client systems 210.

The server system 202 includes various functional components which operate together to provide server side functionality.

One component of server system 202 is a production application 203. The production application 203 is executed by a computer processing system to configure the server system 202 to provide server-side functionality to one or more corresponding client applications (e.g. client application 212 described below). The server-side functionality includes operations such as user account management, login, and production specific functions—for example creating, saving, publishing, and sharing productions.

To provide the server-side functionality, the production application 203 comprises one or more application programs, libraries, APIs or other software elements. For example, where the client application 212 is a web browser, the production application 203 is a web server such as Apache, IIS, nginx, GWS, or an alternative web server. Where the client application 212 is a native application, the production application 203 is an application server configured specifically to interact with that client application 212. Server system 202 may be provided with both web server and application server applications.

In the present example, the production application 203 includes a beat analysis module 204. The beat analysis module 204 processes audio elements and generates beat metadata. That is, given an audio element, the beat analysis module 204 determines timing information for beats in the audio element, i.e., their position in time relative to the start of the audio element, and emphasis information—indicating whether a given beat is a downbeat or any other beat in a bar. In order to do so, the beat analysis module 204 includes or is in communication with a graph engine 209. A graph engine processes graph data structures efficiently by traversing nodes in a graph in parallel. The operation of the beat analysis module 204 will be described later in detail.

In the present example, the server system 202 also includes a data store 206, which is used to store various data required by the server system 202 in the course of its operations. Such data may include, for example, user account data, production datasets 207, beat metadata 208 and other data in respect of productions that have been created by users.

Generally speaking, a production dataset 207 includes (or at least references) content data (e.g. data in respect of video, graphic, and audio elements that make up the production) and metadata—for example element timing data that defines when a given element is to play, element size and position data (for visual elements), volume data (for audio elements), and other data in respect of the production and/or elements the form part thereof.

The precise data that makes up a production dataset 207 and the structures used to store that data in the data store

206, can vary greatly. This section provides one example of a production dataset 207, and the examples that follow are in the context of this example. It will be appreciated, however, that alternatives are possible and different types of production data may be stored in different ways.

In the present disclosure, a production includes an ordered sequence of one or more scenes and an audio element. The scenes include one or more visual elements.

Visual elements herein are divided into what will be referred to as video elements and graphic elements. Video elements may, for example, be MPEG-4, MOV, WMV, or other format video items. Graphic elements are other, non-video, visual elements such as photographs or other images, shapes, text, and/or other visual elements. Graphic elements may, for example, be JPEG, PNG, GIF, BMP, or other formatted graphic items. Graphic elements may initially be vector graphic items (e.g. SVG or other vector formatted content), though such items are rasterised when included in a visual production.

In the present examples, an audio element is a content item such a sound effect, music track, or voice-over track. An audio element may, for example, be WAV, MPEG-3, FLAC, or other formatted audio item. In the present examples, an audio element is distinct to audio that is encoded with a video element.

In addition to the actual visual/audio elements, the production data 207 for a given production includes element timing data that defines when an element is to be played in the production.

In the present examples, a production dataset 207 includes production metadata, scene data, audio element data, and visual element data.

By way of specific example, a production dataset 207 may be stored in dictionary/key-value pair data type such as:

```
{
  "production": {
    "id": "abc123",
    "name": "My Production",
    "dimensions": {"width": 1920, "height": 1080},
    "audio data": [{audio element 1}]
    "scene data": [{scene record 1}, {scene record 2}, ... { scene record
    n}],
  }
}
```

In this example, the dataset 207 for a given production includes a production identifier (uniquely identifying the production), a production name, and production dimension data (defining a default dimension for the scene(s) of the production).

Audio data for the production is stored in an array of audio records (discussed below), each audio record being in respect of an audio element that has been added to the production.

Scene data for the production is stored in an array of scene records (discussed below), each scene record being in respect of scene that has been added to the production. In the present example, the position of a scene record in the scene data array defines its position in the production (e.g. a scene record at index n appears before a scene record at index n+1). In alternative embodiments, scene position/order may be stored as an explicit value in each scene record (or elsewhere).

In this example, each audio record in the audio data array includes the following data:

```
{
  "audio element source": "<content reference>",
  "production start offset": <start offset>,
  "trim": [<start trim point>, <end trim point>],
  "volume": [<volume data>]
}
```

For each audio element, source data provides a reference (e.g. a link, URL, or other pointer) to the audio track associated with the audio element. The production start offset provides a number of seconds (>=0) that play of the audio element is offset from the start of the production. That is, if the start_offset is 5.5, the audio element will start playing 5.5 seconds into the production. Trim data provides start and/or end trim points, which are relative to the audio track and define what portion of the audio track is played in the production. For example, trim data of [3.3, 10] indicates that when the audio element is played in the production it is played from 3.3 seconds into the native (i.e., untrimmed) duration of the audio track to 10 seconds into the native duration of the audio track. Volume data may include a single value (e.g. a float/double) indicating a volume for the entire audio element, or more complex data—for example a series of timing/volume pairs that define how the volume changes over the duration of the audio element.

In addition to the trim data or instead of the trim data, the audio element record may include loop information. This may be present in case the audio element includes a portion of or an entire audio track played multiple times. In case a portion of the audio track is played multiple times, the audio data includes trim data and loop data. In case the entire audio track is played multiple times, the audio data includes loop data but not trim data. The loop data may include a number representing the number of times the portion or entire audio track is played.

In this example the play duration and end time of audio elements are not explicitly stored (though could be if desired). The play duration of an audio element can be calculated based on the actual content of the audio element (which will have a native duration) and any trim points defined for the audio element. The end time of an audio element can be calculated by adding the audio element's play duration to its start offset.

In this example, each scene record in the scene data array includes the following data:

```
{
  "duration": "<no. seconds>",
  "outro_transition": {<outro transition data>},
  "animation_style": <data defining animation style>,
  "visual element data": [{element record 1}, ... {element record n}],
}
```

In the example scene record above, the duration defines the duration of the scene—e.g., in seconds. The duration may be stored, or may instead be calculated based on visual elements that have been added to the scene. The outro transition provides (or references) data defining an outro transition for the scene. Such a transition may be defined, for example, by a transition style (e.g. fade, slide, or other style), an outro duration (e.g. in seconds), and (if relevant to the style) a direction. The animation style provides data in respect of an animation style associated with the scene and that is applied to visual elements added to the scene (unless an element has an overriding animation style). Animation styles may, for example, operate to cause elements to fade in/out, pop (e.g. go from a 0×0 size to actual size with a bounce at the end), or appear/disappear/behave with any other animation style.

Data in respect of visual elements that have been added to a scene is stored in an array of visual element records (discussed below), each visual element record being in respect of a visual that has been added to the scene. In the present example, the position of a visual record in the visual element data array defines its depth (e.g. z-index) in the scene (e.g. a visual element record at index n appears behind a visual element record at index n+1). In alternative embodiments, element depth may be stored as an explicit value in each visual element record (or elsewhere).

In this example scene start and end times are not explicitly stored (though could be if desired). A given scene's start time can be calculated by adding together the durations of all preceding scenes. A scene's end time can be calculated by adding its duration to its start time.

The present disclosure provides two general approaches to visual elements.

In one approach to visual elements, any visual element that is added to a scene will play (i.e. be displayed) for the duration of that scene: it will start when the scene starts and end when the scene ends. In this embodiment, and by way of example, each visual element record includes the following data:

```
{
  "type": <element type>,
  "position": [<x>, <y>],
  "size": [<height>, <width>],
  "animation_style": <data defining animation style>,
  "element_source": "<content reference>",
  "trim": [<start trim point>, <end trim point>],
  "volume": [<volume data>]
}
```

In this example, the type provides an identifier of the type of element the record relates to e.g. video, image, text, chart/graph, or other type. The position defines an x and y coordinates of an origin of the element on a canvas (described below). Any appropriate coordinate system and origin may be used, for example the origin defining the position (e.g. in pixels) of the top-left corner of the element. The size defines the size of the element—in this case by way of a height value and width value in pixels). The animation style provides animation data if the animation style associated with the scene element it has been added to is to be overridden. The source provides a reference (e.g. a link, URL, or other pointer) to the actual content of the visual element. The trim and volume are relevant to video type elements and provide trim/volume data, which are similar to these data items as described above with reference to audio element records.

In this approach, where visual elements associated with a scene are configured to play for the entire scene, image elements added to a scene will play for the entire scene. Video elements that have a play duration (calculated with reference to the video elements' native duration and any trim points) which is less than the duration of the scene the element appears may be automatically looped to play for the scene duration or may be set to play once only. As described below, when a video element is added to a scene having shorter duration than the video element's play duration, the scene's duration is lengthened to accommodate the video element.

In the other general approach to visual elements described herein, visual elements added to a scene need not play for the entire duration of that scene. In this case, each visual element record includes additional data to that described above to specify when a visual element is played within a scene. For example:

```
{
  ...
  "scene start offset": <start offset>,
  "play duration": <duration>,
  "loop": <loop data>,
  "multi-scene element": <multi scene element identifier>
}
```

In this case the scene start offset provides a number of seconds (>=0) that play of the visual element is offset from the start of the scene it appears in. That is, if the start offset is 5.5, the visual element will start playing (be displayed) 5.5 seconds into the scene. The play duration defines a duration (e.g. in seconds) that the visual element will play for. In the present example, where an element is associated with a particular scene, the start offset and play duration will not result in the element playing beyond the end of the scene: the element will stop playing at the end of the scene it is in regardless of the visual element's play duration (though, as discussed below, the same visual element may be displayed in a subsequent scene).

Loop data is relevant to video elements and provides a mechanism to define a number of times (>=1) that a video element is to loop within the scene. Once again, in the present example a video cannot loop beyond the end of the scene it has been added to. For video elements, play duration may be defined by either a loop value or a play duration value (in which case the video is set to loop for the play duration).

In this example, the multi-scene element value is used if a graphic element is to be continuously played across multiple scenes (e.g. from a point in scene n through to a point in scene m, m>n). In this case, an element record for the visual element is created and stored in the visual element array of each scene the element appears in. The multi-scene element is assigned a multi scene element identifier (unique for the production) and that same identifier is included in each element record created for the multi-scene element. Where a graphic element is a multi-scene element, it may not be subject to any outro transition of a scene if the element appears in the next scene.

In alternative embodiments, rather than being specifically associated with one or more specific scenes, data for a multi-scene graphic element may be stored in a production-level array of multi-scene graphic elements (similar to the audio data described above). In this case, a multi scene element may be provided with a list of one or more start/end timing pairs, which define (relative to the production as a whole) when the element is displayed (as well as other attributes such as type, size, position, source etc.). For example, an element may be provided with a list of timings such as [(0, 3), (6, 9), (15, 20)] which would indicate that the element is displayed from the start of the production to 3 seconds, from 6 seconds into the production to 9 seconds, and from 15 seconds into the production to 20 seconds. In this case, in order to determine which scene(s) a given multi-scene graphic element is displayed in calculations are performed based on the multi-scene element's start and end time(s).

In this example, a visual element's production start offset (with reference to the production as a whole rather than a particular scene) and end time (either within a scene or within the production as a whole) are not explicitly stored (though could be if desired). A visual element's production start offset can be calculated by adding the visual element's scene start offset to the scene's start time (calculated as discussed above). The scene end time of a visual element (with reference to the scene it is part of) can be calculated by adding its duration to its scene start offset. The production end time of a visual element (with reference to the production as a whole) can be calculated by adding its duration to its production start time.

Where loop data is stored for a video element instead of a duration, the play duration of the video element can be determined by calculating the duration of a single loop (e.g. based on the native duration of the video element and any trim points, as per audio elements described above) and multiplying that by the number of loops.

The above provides an example of production data 207 that is relevant to the features and techniques of the present disclosure. A typical visual production will include additional data items to those described. By way of example, in addition to size any visual element added to a production may include data such as rotation, transparency, and cropping (defining what portion of the referenced element is visible when the element is cropped). By way of further example, specific types of elements may have attributes/data specific to those types of elements—e.g. text elements may define text attributes (such as font, size, colour, style, alignment, and other text attributes), image elements may define image attributes (such as brightness filters, saturation filters, and other attributes). Many other data items may be provided for.

The data store 206 also stores beat metadata. Beat metadata may be generated and stored for the audio elements associated with production datasets. Beat metadata may also be stored with respect to audio elements that are not already associated with production datasets, but available at the production application for adding to a production at a later stage. Each beat metadata record stored in the beat metadata 208 includes a unique identifier of the audio element it is associated with, a beat metadata identifier, timing information for each beat in the audio element, and an indication of whether a beat is a downbeat or not. In some examples, the timing information may be in seconds offset from the starting position of the audio track (e.g., 0.2 s, 0.6 s, 0.9 s, etc.). In other examples, the timing information may be in frames (e.g., 6, 16, 36, 42, etc.). Further, in some examples, the indication of whether a beat is a downbeat or not may be provided by providing the position of each beat in a corresponding bar (e.g., 1, 2, 3), in which case a position of 1 indicates a downbeat and the positions of 2 and 3 indicate non-downbeats. Alternatively, the indication of a downbeat may be provided by a flag (e.g., 0 indicating non-downbeat and 1 indicating downbeat).

Returning to FIG. 2, while one data store 206 is depicted, server system 202 may include/make use of multiple separate data stores—e.g. a user data store (storing user account details), one or more element library data stores (storing video, graphic, and audio elements that users can add to visual productions being created); a visual production data store; a beat metadata data store, and/or other data stores.

In order to provide server side functionality to clients, server system 202 will typically include additional functional components to those illustrated and described. As one example, server system 202 may include one or more firewalls (and/or other network security components) and load balancers (for managing access to the production application 203).

The server system 202 components have been described as functional components, and may be implemented by hardware, software (data and computer readable instructions which are stored in memory and executed by one or more computer processing systems), and/or a combination of hardware and software.

The precise hardware architecture of server system 202 will vary depending on implementation, however may well include multiple computer processing systems (e.g. server computers) which communicate with one another either directly or via one or more networks, e.g. one or more LANS, WANs, or other networks (with a secure logical overlay, such as a VPN, if required).

For example, production application 203 may run on a single dedicated server computer and data store 206 may run on a separate server computer (with access to appropriate data storage resources). As an alternative example, server system 202 may be a cloud computing system and configured to commission/decommission resources based on user demand. In this case there may be multiple server computers (nodes) running multiple production applications 203 which service clients via a load balancer.

Client system 210 hosts a client application 212 which, when executed by the client system 210, configures the client system 210 to provide client-side functionality for/interact with the production application 203 of the server system 202. Via the client application 212, a user/designer can interact with the production application 203 in order to perform various operations such as creating, editing, saving, retrieving/accessing, publishing, and sharing visual productions.

Client application 212 may be a web browser application (such as Chrome, Safari, Internet Explorer, Opera, or an alternative web browser application) which accesses the production application 203 via an appropriate uniform resource locator (URL) and communicates with production application 203 via general world-wide-web protocols (e.g. http, https, ftp). Alternatively, the client application 212 may be a native application programmed to communicate with production application 203 using defined application programming interface (API) calls.

In the present example, client application 212 includes an editing module 214. As described below, the editing module 214 displays production user interfaces (as will be described later) and allows (or configures the client application 212 to allow) a user to create, edit, save, retrieve/access, publish, and share visual productions via the user interfaces using client system 210. In addition, the editing module 214 provides a way for a user to invoke the beat analysis module 204 on audio elements. It also consumes beat metadata generated by the beat analysis module 204 to surface additional controls to a user viewing a visual production interface. The operation of the editing module 214 and the UI generated by this interface will be described later in detail.

The editing module 214 may be a software module such as an add-on or plug-in that operates in conjunction with the client application 212 to expand the functionality thereof. In alternative embodiments, however, the functionality provided by the editing module 214 may be natively provided by the client application 212 (i.e. the client application 212 itself has instructions and data which, when executed, cause the client application 212 to perform part or all of the element grouping functionality described herein).

Client system 210 may be any computer processing system which is configured (or configurable) by hardware and/or software to offer client-side functionality. By way of example, client system 210 may be a desktop computer, a laptop computer, a netbook computer, a tablet computing device, a mobile/smart phone device, a personal digital assistant, or an alternative computer processing system.

Although not illustrated in FIG. 2, client system 210 will typically have additional applications installed thereon, for example, at least an operating system application such as a Microsoft Windows operating system, an Apple macOS operating system, an Apple iOS operating system, an Android operating system, a Unix or Linux operating system, or an alternative operating system.

The architecture described above and illustrated in FIG. 2 is provided by way of example only, and variations are possible.

For example, while the editing module 214 has been described and illustrated as being part of/installed at the client system 210, the functionality provided by the editing module 214 could alternatively (or additionally) be provided by the server system 202 (for example as an add-on or extension to production application 203, a separate, standalone application that communicates with the production application 203, or a native part of the production application 203).

As a further example, the editing module 214 could be provided as an entirely separate service—e.g. running on a separate server system to server system 202 and communicating with client application 212 (and/or server system 202) as required to perform the functionality described herein.

As yet a further example, the functionality described herein may be provided by a self-contained application that is installed and runs solely on a client system without any need of a server application.

The features and techniques described herein are implemented using one or more computer processing systems.

For example, in networked environment 200 described above, client system 210 is a computer processing system (for example a personal computer, tablet/phone device, or other computer processing system). Similarly, the various functional components of server system 202 are implemented using one or more computer processing systems (e.g. server computers or other computer processing systems).

Figure 3:
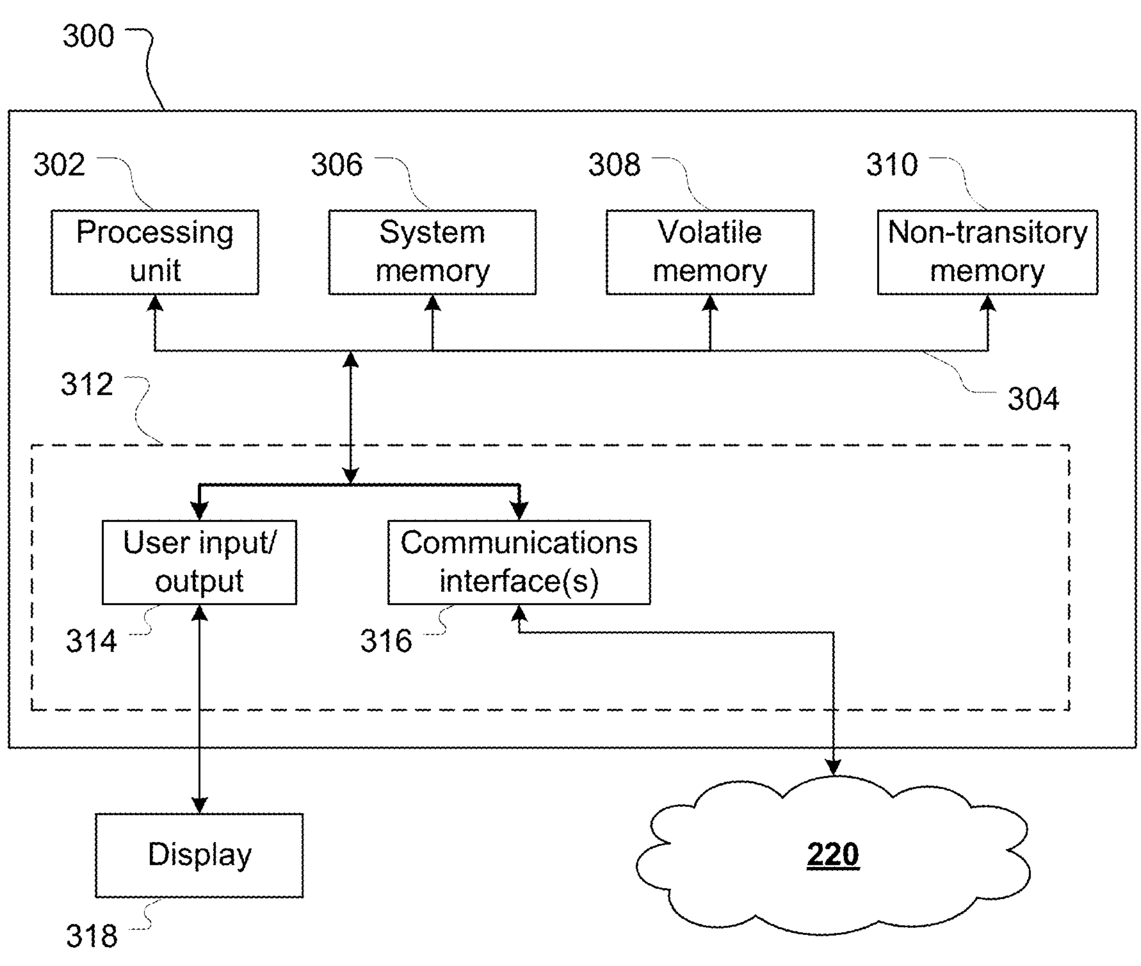
FIG. 3 is an example computer processing system configurable to perform various features described herein.

FIG. 3 provides a block diagram of a computer processing system 300 configurable to implement embodiments and/or features described herein. System 300 is a general-purpose computer processing system. It will be appreciated that FIG. 3 does not illustrate all functional or physical components of a computer processing system. For example, no power supply or power supply interface has been depicted, however system 300 either carries a power supply or is configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 300 includes at least one processing unit 302. The processing unit 302 may be a single computer processing device (e.g. a central processing unit, graphics processing unit, or other computational device), or may include a plurality of computer processing devices. In some instances, where a computer processing system 300 is described as performing an operation or function, all processing required to perform that operation or function will be performed by processing unit 302. In other instances, processing required to perform that operation or function may also be performed by remote processing devices accessible to and useable by (either in a shared or dedicated manner) system 300.

Through a communications bus 304, the processing unit 302 is in data communication with one or more machine-readable storage (memory) devices, which store instructions and/or data for controlling operation of the processing system 300. In this example, system 300 includes a system memory 306 (e.g. a BIOS), volatile memory 308 (e.g. random access memory such as one or more DRAM modules), and non-transitory memory 310 (e.g. one or more hard disk or solid state drives).

System 300 also includes one or more interfaces, indicated generally by 312, via which system 300 interfaces with various devices and/or networks. Generally speaking, other devices may be integral with system 300, or may be separate. Where a device is separate from system 300, connection between the device and system 300 may be via wired or wireless hardware and communication protocols, and may be a direct or an indirect (e.g. networked) connection.

Wired connection with other devices/networks may be by any appropriate standard or proprietary hardware and connectivity protocols. For example, system 300 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 300 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 300 connects—whether by wired or wireless means—include one or more input devices to allow data to be input into/received by system 300 for processing by the processing unit 302, and one or more output device to allow data to be output by system 300. Example devices are described below, however it will be appreciated that not all computer-processing systems will include all mentioned devices, and that additional and alternative devices to those mentioned may well be used.

For example, system 300 may include or connect to one or more input devices by which information/data is input into (received by) system 300. Such input devices may include keyboards, mice, trackpads, microphones, accelerometers, proximity sensors, GPS devices and the like. System 300 may also include or connect to one or more output devices controlled by system 300 to output information. Such output devices may include devices such as display devices, speakers, vibration modules, LEDs/other lights, and such like. System 300 may also include or connect to devices which may act as both input and output devices, for example memory devices (hard drives, solid state drives, disk drives, compact flash cards, SD cards and the like) which system 300 can read data from and/or write data to, and touch screen displays which can both display (output) data and receive touch signals (input).

In the present embodiments, when system 300 is configured as a client system 210 it will include at least a display 318. Display 318 may be a touch screen display permitting both input (e.g. via touch inputs) and output (by displaying the user interfaces described herein). When configured as a client system 210, system 300 may (and will if display 318 does not permit input) include other input devices—for example, a keyboard, pointing device, and/or other input devices.

System 300 also includes one or more communications interfaces 316 for communication with a network, such as network 220 of environment 200 (and/or a local network within the server system 202 or OS). Via the communications interface(s) 316, system 300 can communicate data to and receive data from networked devices, which may themselves be other computer processing systems.

System 300 may be any suitable computer processing system, for example, a server computer system, a desktop computer, a laptop computer, a netbook computer, a tablet computing device, a mobile/smart phone, a personal digital assistant, or an alternative computer processing system.

System 300 stores or has access to computer applications (also referred to as software or programs)—i.e. computer readable instructions and data which, when executed by the processing unit 302, configure system 300 to receive, process, and output data. Instructions and data can be stored on non-transitory computer-readable storage media accessible to system 300. For example, instructions and data may be stored on non-transitory memory 310. Instructions and data may be transmitted to/received by system 300 via a data signal in a transmission channel enabled (for example) by a wired or wireless network connection over interface such as 312.

Applications accessible to system 300 will typically include an operating system application. System 300 also stores or has access to applications which, when executed by the processing unit 302, configure system 300 to perform various computer-implemented processing operations described herein. For example, and referring to the networked environment of FIG. 2 above: client system 210 includes a client application 212 and editing module 214 which configure the client system 210 to perform the operations described herein.

In some cases, part or all of a given computer-implemented method will be performed by system 300 itself, while in other cases processing may be performed by other devices in data communication with system 300.

The below describes computer implemented methods and user interfaces for creating and editing digital visual productions. The processing described below is described as being performed by the production application 203 in conjunction with the editing module 214. As described above, however, processing may be performed by the editing module 214 alone, by the editing module 214 in conjunction with the client application 212, or by the editing module 214 in conjunction with other applications (e.g., running on client system 210 or an alternative system such as server system 202).

Beat tracking (i.e., determining the timing of beats in an audio track) can be considered a challenging problem. One of the problems is the complexity of music itself—it is usually polyphonic, has overtones and so on. Another problem is the temporal nature of audio in general, which makes it difficult to detect tempo and/or beats correctly. For instance, beats do not always align with note onsets but also depend on syncopation and are often based on the performance's expression. Furthermore, a musical piece may have continuous or abrupt variations in tempo and rhythm.

Figure 4:
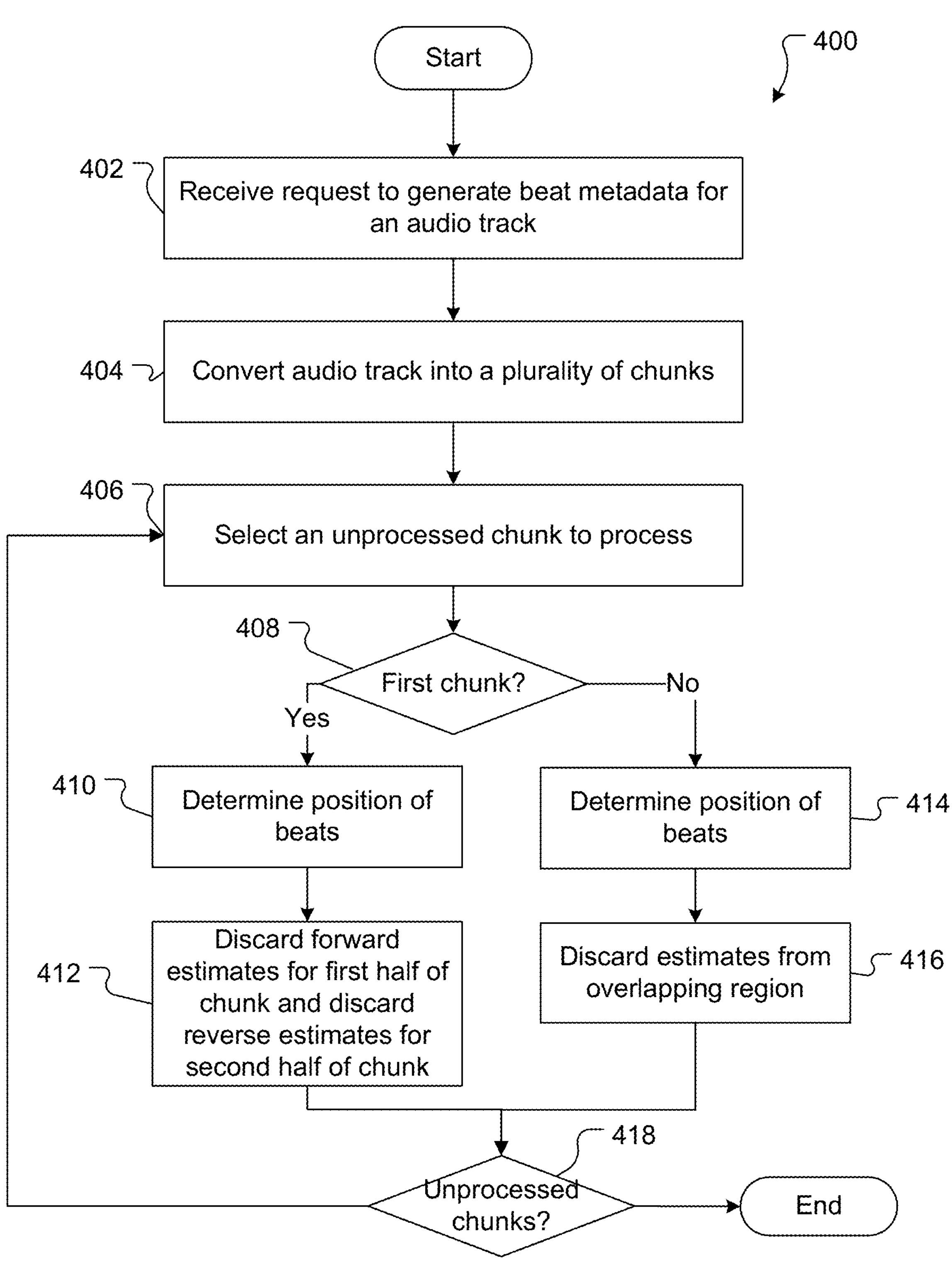
FIG. 4 is a flowchart depicting an example method for generating beat metadata according to aspects of the present disclosure.

FIG. 4 illustrates an example method 400 for tracking or identifying beats in an audio track and generating beat metadata 208. As described previously, beat metadata includes data indicating the timing information of beats and whether a beat is a downbeat or not.

It will be appreciated that the method 400 can be performed online or offline. Online, as referred to herein, means processing a real-time stream of audio data and determining beat metadata in near real time without having the entire audio file when commencing the processing. Offline, as referred to herein, means processing stored audio files such that the entire audio file can be processed to extract any necessary information.

The method commences at step 402, where the beat analysis module 204 receives a request to generate beat metadata for an audio track. In some examples, this request may be generated when a user adds an audio track to a visual production the user wishes to create. In other examples, the request may be automatically generated when an audio track is added to the data store 206.

In some cases, the request may include a single audio track and in other examples, it may include a batch of audio tracks. Single audio tracks may be provided in cases where a user adds an audio element to a visual production that is not already associated with beat metadata (e.g., when a user uploads a song or any other audio file from their own client device to add to a production). Alternatively, single audio tracks may be provided in case a new audio track is added to the data store 206. Audio track batches may be provided in case the server system 202 decides to obtain beat metadata for all the audio files in the data store 206 that do not already include beat metadata. Batched requests may be generated periodically and/or randomly (e.g., when a threshold number of new audio files are added to the data store 206 that do not have associated beat metadata).

In any event, the request includes at least information about one audio track. The information may include, e.g., an identifier of the audio track and a link to the location where the audio track is stored. In other cases, the information may include the entire audio track (e.g., in case it is added by a user to the visual production by directly uploading their own audio track (that is not stored or available at the data store 206).

At step 404, the beat analysis module 204 retrieves an unprocessed audio track and divides the track into a plurality of chunks. Conventional techniques for detecting beats in audio tracks treat the audio track as indivisible. As such, beat metadata can only be computed once the entire audio track is processed. Consequently, this delays the time taken to determine beat metadata. This delay may not be much of a problem in case beat metadata is computed for a few audio tracks or performed offline. However, in case the system has to generate beat metadata for a very large number of audio tracks and/or generate beat metadata in near real-time, such delays are undesirable. To address these delay issues, the beat analysis module 204 divides the audio track into smaller chunks such that they can be processed independently (either sequentially or simultaneously) to determine the beat metadata.

Figure 5:
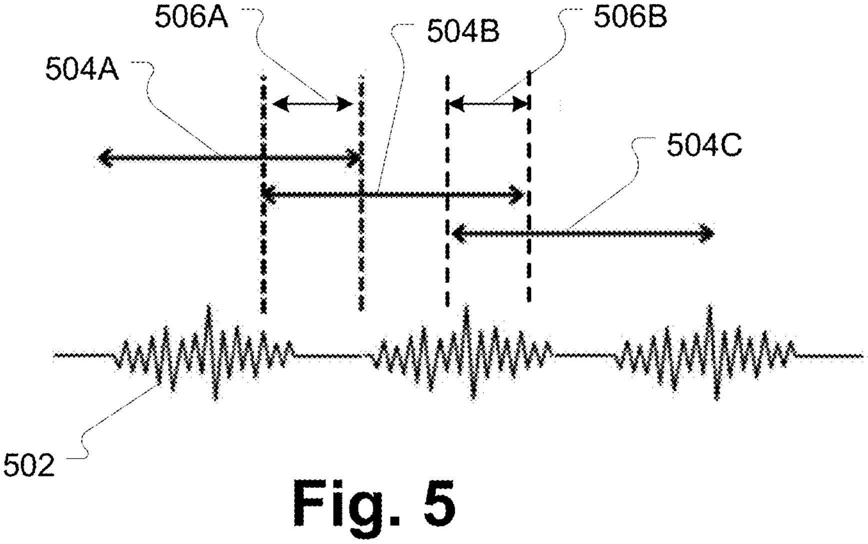
FIG. 5 depicts chunking of an audio track according to aspects of the present disclosure.

In some embodiments, the chunks are of overlapping nature as depicted in FIG. 5. In particular, FIG. 5 depicts a waveform representation 502 of an audio track. The waveform representation 502 is divided into three overlapping chunks—504A, 504B, and 504C. The overlapping regions are 506A and 506B and they are at the start of chunks 504B and 504C. The start of chunk 504A does not include an overlapping region.

In this example, the lengths of the chunks 504A-C are the same and their overlap regions 506A-B are also the same length (but smaller than the length of the chunks). However, in other embodiments, the length of individual chunks 504 and/or individual overlap regions 506 may vary. Further, the number of chunks 504 and the overlap regions 506 between the chunks can be configured to suit any input audio track and may depend on one or more of the length of the audio track, the tempo of the audio track, the required accuracy, and the required processing time. For higher accuracy, longer chunks may be desirable whereas for increased processing speed, shorted chunks may be used. In some examples, the average chunk length may be 20 seconds and the average overlap region may be 2 seconds.

In case of online mode, as the entire audio is not available when chunking, a predetermined chunk length (e.g., 20 seconds) and overlap region length (2 seconds) may be selected and used as the audio is being streamed. In this case, the chunks may be processed as they are received according to method 400.

In some embodiments, the beat analysis module 204 maintains an audio track descriptor that includes chunking information such as number of chunks, the sequential order of the chunks, an indicator of whether a chunk is a first chunk, the length of each chunk, the length of the overlapping regions in each chunk, etc. The table below shows an example audio track descriptor that may be temporarily maintained to store this information. The descriptor may be discarded once process 400 ends.

| | |
|---|---|
| Audio track identifier | 3894723897 |
| Length of audio | 3 minutes |
| No. of chunks | 9 |
| Chunk data | {C1}, {C2}, {C3}, . . . , {C6} |
| First chunk | C1 |
| Size of each chunk | 20 seconds |
| Overlapping region | 2 seconds |

In this example, each chunk is the same length and the overlapping regions are the same and therefore all the information can be present in a single descriptor. If the chunks are of different lengths and/or have different lengths of overlap regions, the system can maintain an audio track descriptor and individual descriptors for each chunk, where each chunk level descriptor stores a chunk identifier, a chunk position, chunk length, and overlap region length. Further, in the present example, the position of a chunk in the chunk set defines its position in the audio track (e.g., a chunk at index n corresponds to a portion of the audio track before a chunk at index n+1). In alternative embodiments, chunk position/order may be stored as an explicit value in each element descriptor (or elsewhere).

At step 406, an unprocessed chunk 504 is selected. In some examples (e.g., in online mode), the chunks 504 may be selected sequentially—e.g., 504A, then 504B, then 504C, and so on. In other examples, the beat analysis module 204 selects multiple unprocessed chunks 504 concurrently for processing. If multiple unprocessed chunks 504 are selected simultaneously, the beat analysis module 204 may instantiate multiple computing threads to perform the subsequent operations concurrently. In that case, the following steps may be performed concurrently for different chunks—that is, the sequence of steps 408-420 may be performed substantially concurrently for the selected number of unprocessed chunks 504. Concurrent processing reduces the time required to determine the beat metadata for an audio track.

At step 408, the beat analysis module 204, determines whether the selected unprocessed chunk is a first chunk in the sequence of chunks or not. In some examples, the beat analysis module 204 may inspect the audio track descriptor to determine the identifier of the first chunk and then determine whether the identifier of the selected unprocessed chunk matches the identifier of the first chunk. In other examples, the identifier of the chunk may include a sequence number (e.g., C2) and the beat analysis module 204 may determine whether the selected unprocessed chunk is the first chunk based on the sequence number.

In any case, if the beat analysis module 204 determines that the selected unprocessed chunk is the first chunk, the method proceeds to step 410 where the beat analysis module 204 determines the position of beats in the first chunk.

This process involves three sub-steps or stages including feature extraction, likelihood estimation, and post processing. Typically, the feature extraction step is performed using Fourier analysis (in a high-level language), the likelihood estimation is performed using neural networks (and based on computation graphs), and the post processing is performed using hidden Markov models and Viterbi algorithm (in a high-level language).

A computation graph provides a visual and mathematical representation of the sequence of operations involved in a neural network's computation. Each node of the graph corresponds to an operation and the edges of the graph represent the flow of data.

A typical pipeline that includes the feature extraction step being performed in a high-level language followed by the likelihood estimation being performed using computational graphs in a neural network, followed by the post processing being performed again in a high-level language complicates deployment as multiple different languages are used for the processing. Further, neural networks and computational graphs utilize the graph engine 209, which takes advantage of the intrinsic capabilities of the underlying device (e.g., utilizing multiple cores simultaneously, using hardware-accelerated graphics primitives, etc.), but the feature extraction and post processing steps generally utilize general-purpose processors, which may be slower.

To overcome these issues with known methods for determining beat information, the beat analysis module 204 performs all the three states—i.e., feature extraction, likelihood estimation, and post-processing using computational graphs and neural networks. This simplifies deployment (as fewer languages are required) and also allows these three steps to take advantage of the hardware-specific optimizations provided by the graph engine 209—thereby generating the beat metadata faster than previously known systems.

Feature extraction is the process of converting raw audio data into a set of representative features that can be used for subsequent analysis and beat timing estimation. This process includes pre-processing of the raw audio data, such as cleaning and formatting the data, normalizing the audio data to a standard scale, resampling the audio data in a suitable format for feature extraction, etc. Accordingly, at this step, the beat analysis module 204 may pre-process the audio data by, e.g., resampling, filtering or normalizing the audio data.

Thereafter, the feature extraction process converts the pre-processed signal into a time-frequency representation using the Short-Time Fourier Transform (STFT). While a Discrete Fourier Transform (DFT) or Fast Fourier Transform (FFT) converts a function of time into its frequency representation (the transformation is lossless and reversible), STFT is able to represent both aspects at once. This can be imagined as cutting the signal into slices with a certain "window size" and making the slices overlap by a so-called "hop size". For each slice, the FFT is computed and the results are concatenated. In some embodiments, frequency and time resolution are balanced by utilizing multiple spectrograms with different window sizes as features.

Figures 6, 7:
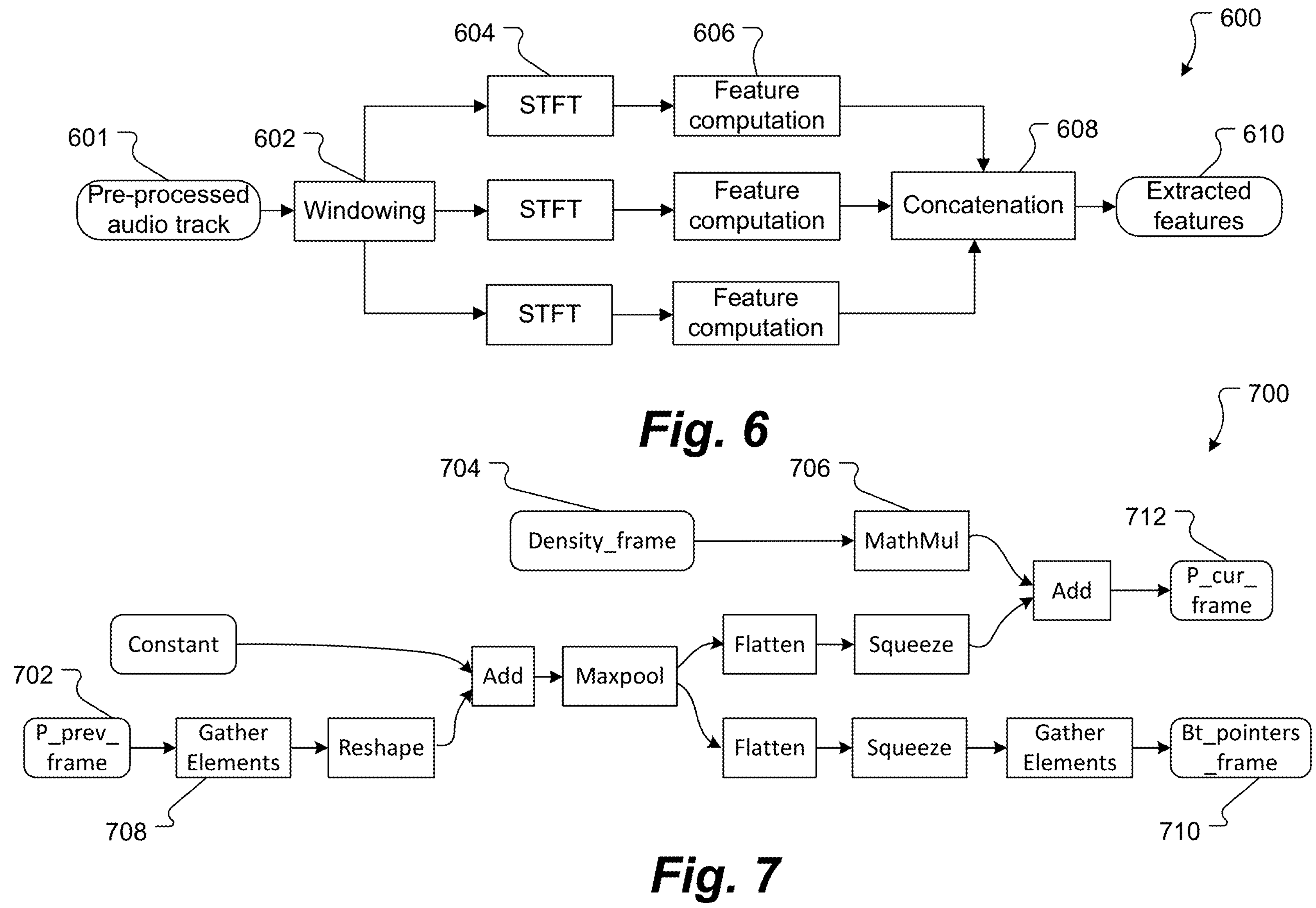
FIG. 6 depicts an example computational graph for extracting features from an audio track using a neural network according to aspects of the present disclosure.
FIG. 7 depicts an example computational graph for post processing an audio track to determine beat metadata using a neural network according to aspects of the present disclosure.

In one example, three spectrograms are generated with window sizes of 1024 samples (23.2 ms), 2048 samples (23.2 ms) and 4096 samples (92.8 ms) samples. Each spectrogram is filtered, e.g., using a filter bank with 6 bands per octave. This results in a total number of 39, 45 and 49 frequency bins, depending on the window length. The different number of bins is due the fact that a bigger window size leads to a better resolution of frequencies and therefore allows the detection of lower frequencies. Windowing captures both short-term and long-term temporal variations in the audio signals. FIG. 6 illustrates a simplified computation graph 600 for extracting features from the audio signal at this step based on the example described above.

As seen in the simplified computation graph 600, the pre-processed signal 601 is first divided into three windows at the windowing step 602. STFT is performed on each segment at 604. The features are then computed for each window at 606, and the results (which are computed features from each window) are concatenated or aggregated over time at 608 to obtain the extracted features 610 for the entire audio signal. It will be appreciated that various sub-processes or mathematical operations may be performed on the data at each step. Various different features may be extracted from the audio signal at this stage. Examples of some features include time-domain features such as root mean square (RMS energy) and temporal spread, frequency-domain features such as spectral bandwidth, Mel-frequency cepstral coefficients (MFCCs), rhythm features such as beat tracking information (e.g., tempo and beat locations) or rhythmic pattern descriptors, etc.

A neural network is then trained and utilized based on the computation graph 600. The neural network includes multiple layers of interconnected artificial neurons. In some examples, the neural network may be a feedforward network. In other examples, it may be a convolutional network or a recurrent neural network. Recurrent neural networks have cyclic connections and can therefore remember the past.

During training of the neural network, a forward and backward pass is implemented based on the computation graph 600. During forward propagation, multiple samples of audio data are fed through the neural network, and computations are performed layer by layer, following the connections in the computation graph 600. The output features (predicted value) are computed by propagating the audio data samples through the graph until the final layer is reached. After the forward pass, the output features (predicted value) are compared to a ground truth (actual value), and a loss (error) is calculated to measure the difference between the predicted and actual values. The computation graph 600 may then be used in reverse during a backward pass. The gradients of the loss with respect to the model parameters are computed. This may involve calculating partial derivatives of the loss with respect to each parameter at each node in the graph. The computed gradients may be used to update the model parameters (weights and biases) using optimization algorithms such as gradient descent. This process is repeated multiple times until the neural network can accurately predict the actual features.

Then, during operation, the unprocessed chunk (selected at step 406) is fed through the neural network in a forward pass and computations are performed layer by layer, following the connections in the computation graph 600. The output features are computed by propagating the audio data samples through the graph until the final layer is reached.

Once output features are generated, likelihood of beat timing is estimated based on the output features. As described above, this is also performed by a neural network. In some examples, e.g., in offline mode, a bidirectional LSTM neural network may be utilized that not only looks back in time but also forward in time. In other examples, e.g., in online mode, a unidirectional LSTM neural network may be utilized that only looks back in time to determine the likelihood of a beat timing in the given chunk.

In case a unidirectional LSTM is utilized, the chunk is fed to the neural network frame by frame to consecutively obtain a new result—that is a beat probability. In case a bidirectional LSTM is utilized, the chunk is fed to the neural network forwards and backwards to obtain the beat probability. Both neural networks can be trained by several annotated audio data sets (in a similar manner to how the neural network is trained for feature extraction). The networks are trained to output activation values that indicate the probability of whether or not a current frame of the selected chunk is a beat or not. Thus, the output is a function of activation values over time.

Next, post processing is performed based on the likelihood estimates. The post processing determines the timing of beats in the chunk and the position of a beat in a bar. For a given tempo and time signature, a bar has s fixed duration in frames. In one example, a hidden Markov Model (HMM) are created for the bar. A HMM is a probabilistic sequence model where the states are hidden but act as causal factors which lead to observable events.

In particular, one hidden state is crated per frame of the chunk and notionally allocated beat numbers. The allocated HMMs can be divided into three parts: A state space, a transition model, and an observation model. The state space for beat tracking is built by iterating through all allowed tempo intervals and time signatures and adding as many hidden states. Each state "knows" which tempo it is assigned to and also its position inside one beat period (usually discretised as T steps). The states are not directly observable (therefore called "hidden"), but the network activations are.

The transition model encodes all transition probabilities between the states. Within one tempo, the states always point to the next state of that tempo with a probability of one. The last state of each tempo points to the first states of all tempi, using an exponential distributed probability, preferring the current tempo and decreasing more and more for adjacent tempi. To influence that behaviour, a parameter called transition Lambda can be utilized which defaults to a value of 100. While higher values would prefer a more constant tempo (spikier distribution), lower values are more likely to change the tempo (more uniform distribution). When summed up, all emission probabilities of every state always result in a value of one.

The observation model encodes the probability that a state emits a beat. An observation Lambda parameter determines into how many parts the beat period is split and defaults to 16. The first part represents the beat and may consist of multiple states inside the state space. For example, a tempo interval 25 would have the first two states representing the beat. For each network activation, two probabilities are computed to cover the case that a beat state would produce that observation as well as that a non-beat state would produce that observation (using the complementary probability of the activation).

As the first chunk is selected, forward and reverse pass of the Viterbi algorithm are used, which falls in the category of dynamic programming algorithms and solves the so called "Decoding-Problem", i.e. finding the most likely path through all states, given some observations. In this case, each state has a Viterbi-value assigned, which starts with a uniform distribution, because in the beginning no assumption about the network activations can be made. Then, for every activation, all states are evaluated. For all states which point to that currently evaluated state, the product of its own Viterbi-value multiplied by the transition probability to the current state and multiplied by the observation model density are computed.

If a logarithm representation is used for the probabilities, instead of the product, the sum is computed. The highest result from one of the previous states is then picked as the new Viterbi-value for the current state. Additionally, for each state, a back-tracking pointer is saved which points to that previous state. This pointer encodes the best path through the state space. After all activations have been iterated in the forward pass, this backtracking path is followed from the last state with the highest Viterbi-value backwards to the start in a reverse pass. This yields the most likely path for the given sequence of observations.

As explained above, since multiple consecutive states are considered beat-states, and thus, multiple frames are related with beats, either the first frame of this section is chosen as a beat-frame or, as a slightly more accurate version, the maximum activation inside that section.

FIG. 7 illustrates an example computation graph 700 of the Viterbi algorithm. This graph 700 is iterated over the probabilities produced by the Likelihood Estimation stage for each frame to identify the most likely position for each beat and its relative position in the bar. In this computation graph, p_prev_frame 702 is the computed probability of being in each hidden state in the previous iteration. "density_frame" 704 is the observation probabilities estimated by the corresponding neural network and include the probabilities—p_beat, p_downbeat, and p_neither indicating the estimated probability that the current frame contains a beat, a downbeat, or neither, respectively. Each hidden state may notionally observe only one of these three events, and so the emission probability may be computed using a lookup table (the MatMul (matrix multiplication step 706). The GatherElements operators 708 use lookup tables which encode the transition probabilities between states. "bt_pointers_frame" 710 is the back-tracking pointer that provides the most likely previous state, and "p_cur_frame" 712 provides the computed probability of the current iteration. This graph 700 is iterated over each frame in the chunk, and a subsequent set of graph operations is used to perform the back-tracking to find the most likely sequence of states and compute their associated beat numbers and offset in seconds.

A neural network is trained based on this computation graph 700 to find the most likely position for each beat and its relative position in a bar. During operation, this graph 700 is iterated over the probabilities produced by the likelihood estimation stage for each frame in the selected chunk to find the most likely position for each beat and its relative position in the bar. The graph is iterated over in a forward direction to obtain one set of beat timing estimates and in a reverse direction to obtain a second set of beat timing estimates. The output may be two list of beat estimates including the time in seconds for the location of each beat and the position in a bar for each beat.

The Viterbi algorithm is performed twice on the selected chunk—once in the forward direction to obtain a first determination of the position of beats and downbeats in the first chunk and once with the reverse direction to obtain a second determination of the position of beats and downbeats in the first chunk. Performing the algorithm in both directions improves the accuracy of the Viterbi algorithm in identifying beats in the first chunk of the audio signal. The first portion of an audio signal has conventionally been processed in a less accurate manner by only performing the analysis in a single direction. This is primarily because of the uniform prior distribution assumption over a state space in a HMM at the beginning of the analysis.

At step 412, the beat analysis module 204 generates a combined determination of the position of the beats in the first chunk by discarding the beat timing data from the first determination (i.e., the beat timing data based on the forward pass) for the first half of the chunk and discarding the beat timing data from the second determination (i.e., the beat timing data based on the reverse pass) for the second half of the chunk. In this way, in the combined determination, the beat timing data from the reverse pass is maintained for the first half of the chunk and beat timing data from the forward pass is maintained for the second half of the chunk. This improves the accuracy of the beat timing data as the more accurate beat timing data from each pass is maintained while the less accurate beat timing data from each pass is discarded.

Returning to step 408, if at this step it is determined that the selected unprocessed chunk is not the first chunk, the method proceeds to step 414 where the beat analysis module 204 determines the position of beats in the unprocessed chunk.

This step is the same as step 410 for the first two sub-steps or stages—i.e., feature extraction and likelihood determination. Both these substeps are performed in a similar fashion to that described with respect to step 410 and therefore this is not described here again.

In the post processing, however, instead of performing the Viterbi algorithm in the forward and backward directions, either the Viterbi algorithm is performed in a forward direction or a Forward algorithm is performed for chunks that are not the first chunk.

In one example, forward variables from a Forward-Algorithm are used. This algorithm computes a probability for each state, given a sequence of observations. Although the algorithm is similar to the Viterbi algorithm, it differs in some points. As with Viterbi, for each observation all states and their respective predecessor states are evaluated. Instead of saving only the highest computed value from one of the predecessors, for the Forward-Algorithm all previous states are taken into account. This is done by multiplying the forward variable of each old state with the transition probability to the current state and then summing up all values. Finally, this sum is multiplied with the observation probability of that state and this result is then saved as the forward value for that state. In other words, the algorithm assigns a probability to each state, incorporating the sum of all paths through the state space, which could have led to that state. For each frame, the state with the maximum likelihood is then picked.

In another example, the Viterbi algorithm may be performed, but only in the forward direction. FIG. 7 illustrates the computation graph 700 for this when the Viterbi algorithm is used and performed in the forward direction only. The remainder of this step is similar to step 410 and therefore is not described in more detail. The output of this step is a list of beats including the time in seconds for the location of each beat and the position in a bar for each beat.

At step 416, the beat analysis module 204 discards the beat timing estimates from the overlapping region of the chunk. To this end, the beat analysis module 204 may inspect the audio descriptor to determine the length of the overlap region of the selected chunk and then discard any beats that were identified in the previous step within this overlap region. For example, if the overlap region is 10 s, the beat analysis module 204 may discard any beat information that has a beat timing less than or equal to 10 s. As described previously with respect to processing the first chunk, this is done to improve the accuracy of the identified beat data as more accurate beat data for the overlapping region is computed during post processing of the previous chunk in the sequence.

The method proceeds to step 418 from either step 412 or step 416. At step 418, a determination is made if any unprocessed chunks remain (e.g., in case all chunks are not concurrently processed and/or if in online mode and additional portions of the audio track are received). In case a determination is made that more unprocessed chunks remain, the method reverts to step 406 where the next one or more chunks are selected for processing. Alternatively, if no more unprocessed chunks remain, the beat analysis module 204 combines the outputs determined for each of the chunks to generate beat metadata for the entire audio track (in the offline mode). In the online mode, instead of generating the beat metadata after step 418, it generates beat metadata for each chunk after step 412 or 416 and communicates it to the editing module 214 for display in a UI (described later). It may then also generate the beat metadata for the entire audio track by combining the beat metadata from each chunk so that it can be stored after the audio track has ended. The method 400 thereafter ends.

In some embodiments, in the online mode, the backward processing of the Viterbi algorithm may not be performed for the first chunk in the interest of time as the speed of identifying beats may be more important than the increased accuracy obtained from executing the algorithm in both directions. In such cases, step 412 may not be performed as the timing of the beats is determined solely based on the forward processing of the Viterbi algorithm.

Accordingly, in method 400, all the sub-steps for processing the audio signal—feature extraction, likelihood estimation, and post processing are performed using computational graphs and neural networks, thereby reducing complexity, and increasing speed of determining beat metadata as compared to previously known systems and methods.

In the offline mode, once the beat timing data is determined for all the chunks in an audio track, it is combined into a beat metadata record and stored in the data store 206. This process is repeated for multiple other audio tracks and the beat metadata for the audio tracks are then stored in the data store 206. In the online mode, as each chunk is processed, the beat timing data for that chunk is communicated to the requesting client system 210 so that beat information can be displayed on the client system 210 with as little delay as possible.

Figure 8:
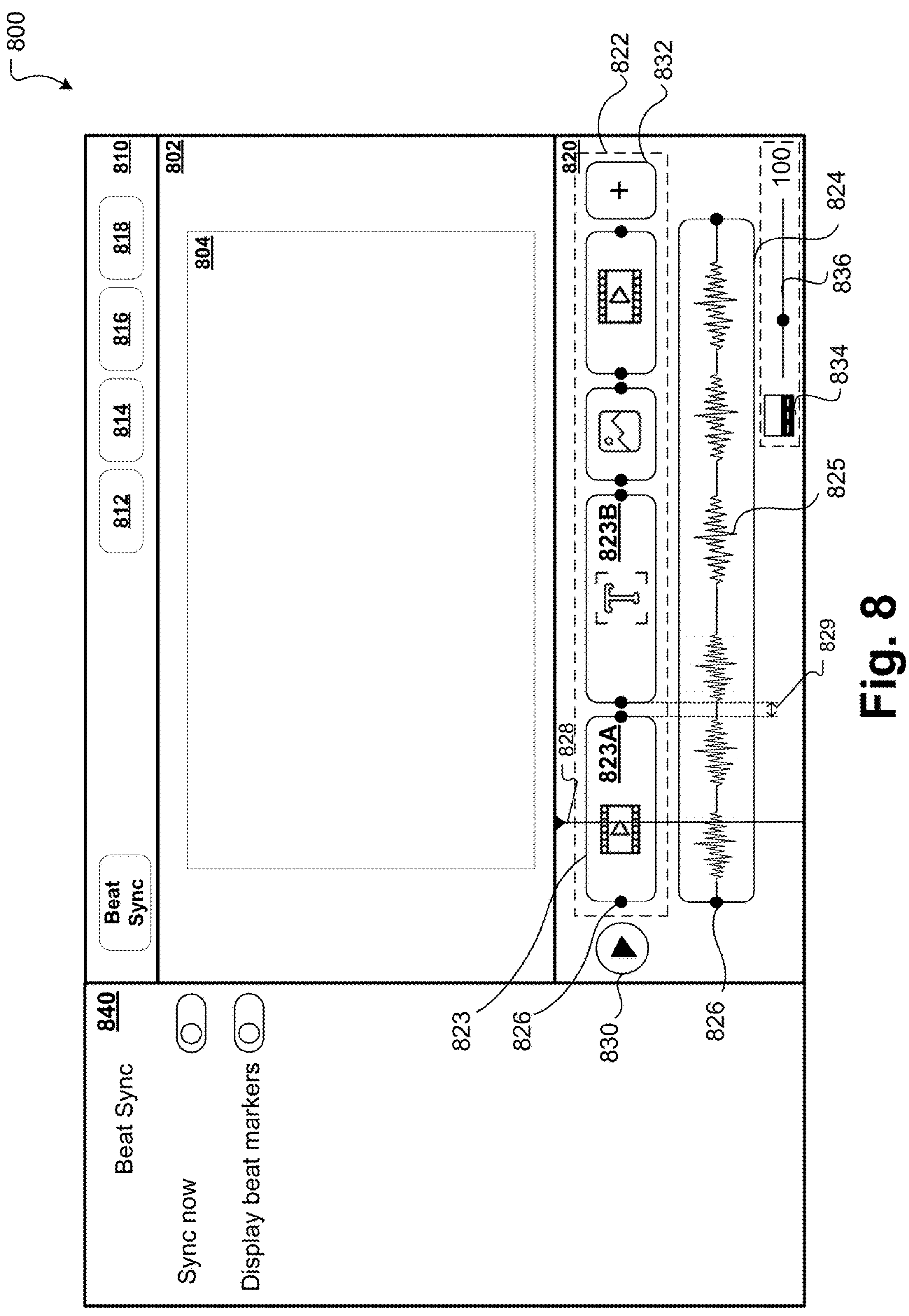
FIG. 8 depicts an example digital visual production user interface according to aspects of the present disclosure.

Turning to FIG. 8, one example of a digital visual production UI 800 according to aspects of the present disclosure is provided. Alternative user interfaces are possible.

UI 800 is displayed at a client system 210 display, in this example, by the client application 212. It includes a design region 802, a control region 810, and a timeline region 820.

The design region 802 displays a canvas 804 that corresponds to a particular position (time) in the visual production. The particular time that the canvas 804 corresponds to is indicated by a playhead 828, which is displayed in the timeline region 820. In the embodiment illustrated by FIG. 8, canvas 804 corresponds to the playback position that is at the start of a scene of the visual production represented by scene preview 822A (discussed below).

The control region 810 includes controls that allow a user to edit and/or adjust characteristics of a selected design element (e.g., an element that is displayed on canvas 804 and has been selected by a user). In the example illustrated in FIG. 8, the control region 810 has four additional controls 812-818 (though may have additional or fewer additional controls).

The additional controls may be adaptive and change based on the part of the UI 800 that is currently selected. For example, if a particular visual element is selected from the timeline region, controls such as "edit video" or "chop video" may be displayed. Alternatively, if a text element on canvas 804 has been selected, the additional controls may include a font type selection control, a font size selection control, and a font colour control. In contrast, if a shape element on canvas 804 has been selected (e.g. a rectangle or the like), the control region 810 may include a line control for adjusting line options and a fill control for adjusting fill options. Additional or fewer controls may be displayed in the control region 810 depending on the type of design element selected in the canvas.

Some controls may be permanently displayed in the control region 810. For example, control 818 may be a permanently displayed 'publish' control, which a user can activate to publish, share, or save the production currently being worked on. When the production is saved, a new production dataset record can be generated and saved in the data store 206. As another example, a particular control (e.g., 816) may be a toggle control allowing a user to display or hide an audio timeline as described below.

The timeline region 820 is used to display a scene timeline 822 and an audio timeline 824. The scene timeline 822 includes scene previews 823 that correspond to scenes of the production being created/edited by the user and the audio timeline 824 includes a waveform representation 825 of an audio element added to the visual production. Each scene of the production has a corresponding scene preview 823A-823D (collectively referred to as scene previews 823). In the present embodiments, when a particular scene has been selected (e.g. by selection of a particular scene preview 823) the current play position within the production (indicated by playhead 828) is set to the start of the selected scene and a canvas 804 corresponding to the current play position is displayed in the design region 802. In the present example, the dimensions of each scene of a production (and, therefore, canvas 804) are defined by the dimensions of the production itself (stored in the production data 207). In order to edit a production a user may add elements to canvas 804, delete elements from canvas 804, or select elements from canvas 804 and edit them (e.g., by changing their spatial position on the canvas, their size, and/or any other relevant attributes associated with an element).

In the present example, the timeline region 820 also has a play control 830 and an add scene control 832.

Activation of the play control 830 by a user causes the visual production to play from the position (time) indicated by the playhead 828 (e.g. on canvas 804). Once the play control 830 has been activated, it turns into a pause control (not shown), which when activated causes the visual production to pause playback. When the visual production is playing, a progress indicator is displayed in the timeline region 820 indicating the current play position of the visual production. The progress indicator may be playhead 828. A user may be able to interact with the playhead 828 (via the client application 212 on client system 210) to move the playhead 828 and, therefore, playback of the visual production to a particular time in the visual production.

Activation of the add scene control 832 by a user causes a scene to be added to the visual production being produced and causes a scene preview 823 corresponding to the newly added scene to be added to the scene timeline 822. In the present embodiments, when a new scene is added, playhead 828 moves so as to align with the start of the newly added scene.

In the example illustrated in FIG. 8, the scene corresponding to scene preview 823A has been selected (e.g., by selection of scene preview 823A or an alternative selection means). Accordingly, the playhead 828 (which indicates the current play position in the production) has been positioned at the start of scene preview 823A and the canvas 804 corresponds to the production at that point. Canvas 804 is blank because no design elements have yet been added to the scene/production at that play position.

As can be seen in FIG. 8, each scene preview 823 includes handles 826 at the two ends of the preview and the waveform representation 825 of the audio element also includes these handles 826 at the two ends of the waveform 825. In some embodiments, even the design elements within scene previews can include handles (not shown). The handles 826 (also referred to as beginning handles and end handles depending on the edge of the scene, design element, or audio element they are positioned at) give users the ability to adjust the relative timing of their corresponding scenes, design elements, or audio element by selecting and dragging one or more of the displayed handles 826. For example, a user may select an end handle of the audio element and drag it to the left to reduce the audio element length or drag it to the right to increase the audio element length.

Similarly, if an end handle of a scene preview is selected and dragged to the right, the width of the scene preview can be increased (which increases the duration of the corresponding scene). Alternatively, if the end handle is dragged to the left, the width of the scene preview 823 can be reduced (which decreases the duration of the corresponding scene).

On the other hand, if a start handle of a scene preview or audio element is selected and dragged to the right, the scene preview width or audio element length can be reduced and if it is dragged to the left, the scene preview width or audio element length can be increased. The production dataset is updated each time a user makes a change to the width of a scene preview or the length of the audio element using the handles (e.g., to update the duration of the scene or the offset and trim of the audio element, respectively).

When displaying the production UI 800, the editing module 214 may maintain the production dataset for that production in its local memory or may communicate with the production application 203, which maintains the production dataset in the data store 206. Any changes made to the length of the track by the user in the UI 800 are made to the production dataset maintained by the editing module 214 or communicated to the production application 203 so that the corresponding audio element data can be updated in the corresponding production dataset stored in the data store 206. If the audio element is shorter in length (e.g., 50 s) than the new length selected by the user (e.g., 1.10 s), the track may be looped so that it restarts playing (e.g., after 50 s) for the additional duration (e.g., 20 s) until the new element length is reached. If the new length selected by the user is shorter than the length of the audio element, the length of the audio element can be updated in the production dataset (e.g., by changing the duration, trim and/or offset fields).

The scene previews 823 may also be draggable and droppable within the scene timeline 822. That is, a scene preview 823 may be selected and dragged anywhere in the scene timeline 822 and dropped. This causes any scene previews in the dropped location to in effect "make way" for the dropped scene preview by either moving left or right. By dragging and dropping scene previews 823 in this manner, a user can alter the sequence of the scenes in the production. Each time a user does so, the relevant data fields of the underlying production dataset may be updated to indicate the new order of the scenes.

As can be seen in timeline region 820, the transitions between scenes (i.e., the end of one scene and the beginning of another) are depicted by visually separating the scene previews 823 and including a small but finite interval 829 between any two adjacent scene previews. This visual separation increases aesthetics and usability—e.g., when users modify the duration or position of scene previews in the scene timeline 822. This interval 829 in the scene previews creates a discontinuity in the waveform representation 825 of the audio element as the end edge of a first scene preview and the start edge of the next scene preview in the timeline correspond to the same moment in time. To account for this discontinuity for the interval 829, a nearby portion of the audio element (e.g., of the same duration as the interval 829) is sampled and repeated in the waveform at these discontinuities to display an unbroken waveform 825. The border of the audio waveform is also extended to cover these discontinuities.

The UI 800 further includes a zoom control 834 to control the timescale of the UI 800. In some embodiments, as shown in FIG. 8, the zoom control 834 include a region selector 835 that allows the user to select a specific region of the UI display. For example, the user can toggle the region selector 835 control to either control the timescale of the design region 802 or the zoom of the timeline region 820. It further includes a control 836 to change the timescale of the selected region—e.g., to either zoom in (i.e., increase the timescale) or zoom out (i.e., decrease the timescale). When the user selects a particular region using the region selector 835, e.g., the timeline region 820, and changes the zoom level using the control 836, only the timescale of the selected region changes, while the timescale of the unselected region remains constant.

In addition to the controls shown in control region 810, if the user selects the audio timeline 824, the control region 810 displays an additional control—a beat sync control 819. Selection of this control 819 results in control panel 840 being displayed. The control panel 840 may be displayed as a side bar (as shown in FIG. 8), a top bar, a bottom bar, etc. Alternatively, it may be displayed as a pop-up window without departing from the scope of the present disclosure.

The control panel 840 may include various controls, including a control 842 to display beat markers in the audio element and a control 844 to automatically synchronize the scenes in the production to the beats of the audio element. Selection of control 842 results in the audio timeline 824 displaying beat information for the audio element.

Figure 9:
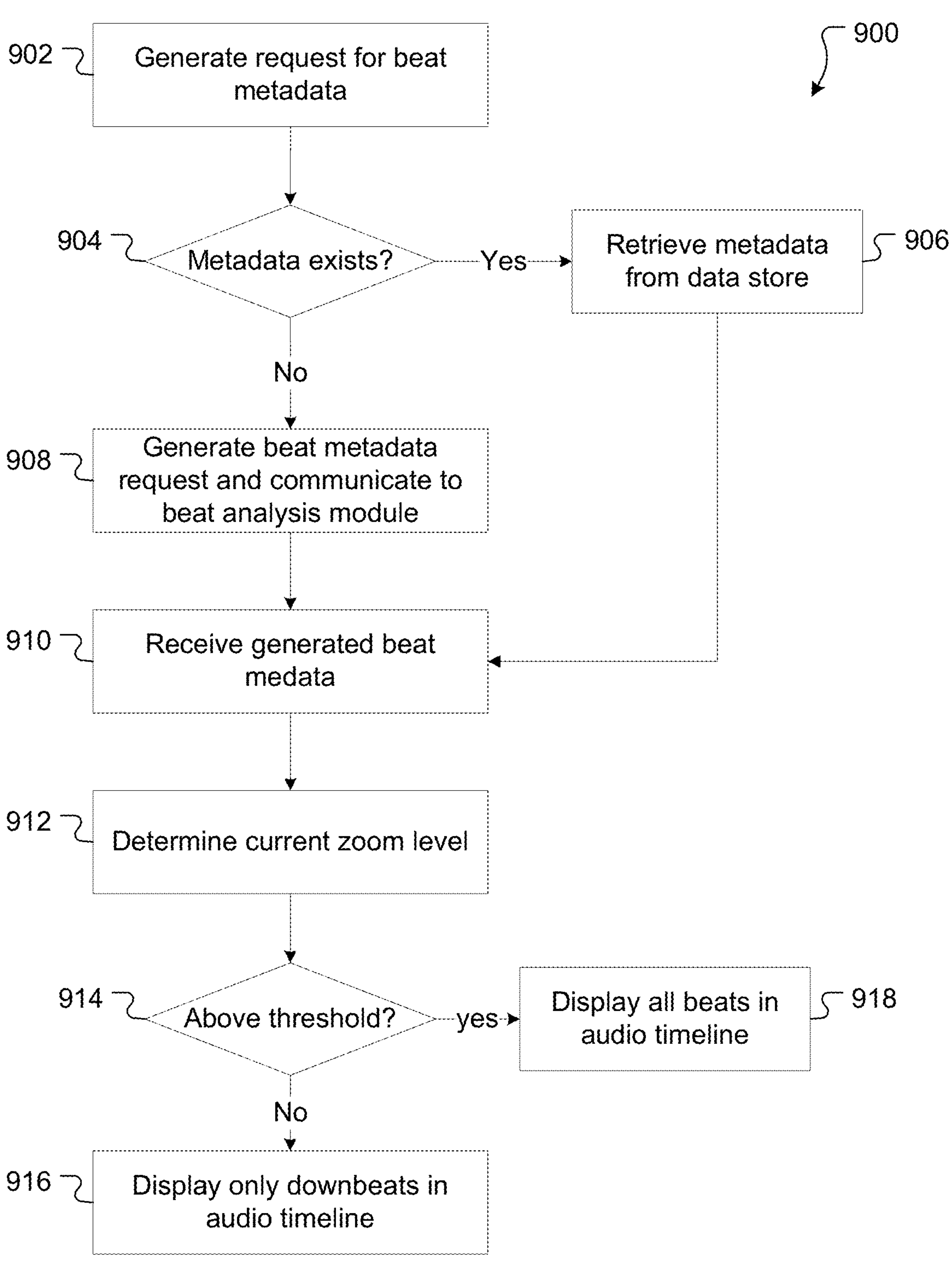
FIG. 9 is a flowchart depicting an example method for displaying beat data in the digital visual production user interface of FIG. 8.

FIG. 9 illustrates an example method 900 performed by the editing module 214 in response to selection of control 842 to display beat markers in the audio timeline 824.

The method commences at step 902, where the editing module 214 generates a request for beta metadata. It may generate this request in response to the user selecting control 842. In another example, the editing module 214 may automatically generate the request when the user adds an audio element to the production using UI 800. The request includes an identifier and/or link of the audio track associated with the visual production displayed in UI 800 if the audio element was selected from a list of audio tracks maintained by the server system 202 and stored in the data store 206. Alternatively, if the audio element has been uploaded directly from the client system 210 or another external source, the entire audio file may be included in the request. The request is communicated to the production application 203.

At step 904, the production application 203 (or the beat analysis module 204) determines whether beat metadata exists for the audio track. In case the request includes an audio track identifier, the production application 203 performs a lookup in the audio element identifier field of the beat metadata records stored in the data store 206 using the audio track identifier received in the request to determine whether a match exists. If a match is found, the production application 203 determines that a beat metadata record exists for the audio track. Otherwise, it determines that a beat metadata record does not exist for the audio track.

In case the request includes the entire audio track file, the production application 203 determines that a beat metadata record does not exist for the audio track.

If at step 904, the production application 203 determines that a beat metadata record exists for the audio track, the method proceeds to step 906, where the production application 203 retrieves the beat metadata record associated with the audio track from the data store 206.

Alternatively, if at step 904, the production application 203 determines that a beat metadata record does not exist for the audio track, the method proceeds to step 908, where the production application 203 requests the beat analysis module 204 to generate beat metadata for the audio track. The request includes a link to the audio track (if it is saved in the data store 206) or the entire audio track (if it is not stored in the data store 206).

The beat analysis module 204 receives the request and performs method 400 to generate the beat metadata. In some embodiments, the method may be performed in the offline mode and in other embodiments it may be performed in the online mode (e.g., depending on latency requirements).

The beat metadata (after either step 906 or step 908) is then communicated to the editing module 214. In case of offline processing, the beat metadata is communicated as a metadata record and in the case of online mode, it may be communicated as a stream of metadata to the editing module at step 910.

The editing module 214 receives the beat metadata and determines the current zoom level (or timescale) of the timeline region 820 of the UI 800 at step 912. This may be done by inspecting UI data maintained by the editing module 214.

Next (at step 914), the editing module 214 determines whether the current zoom level of the timeline region 820 is above or below a threshold zoom level. The threshold zoom level may be any preconfigured zoom level (e.g., 200%).

If the editing module 214 determines that the current zoom level is below the threshold zoom level, the method proceeds to step 916 where the editing module 214 updates the audio timeline 824 to displays beat markers only for the downbeats (i.e., the first beat of every bar) identified in the beat metadata. This is shown in FIG. 10.

Figures 10, 11:
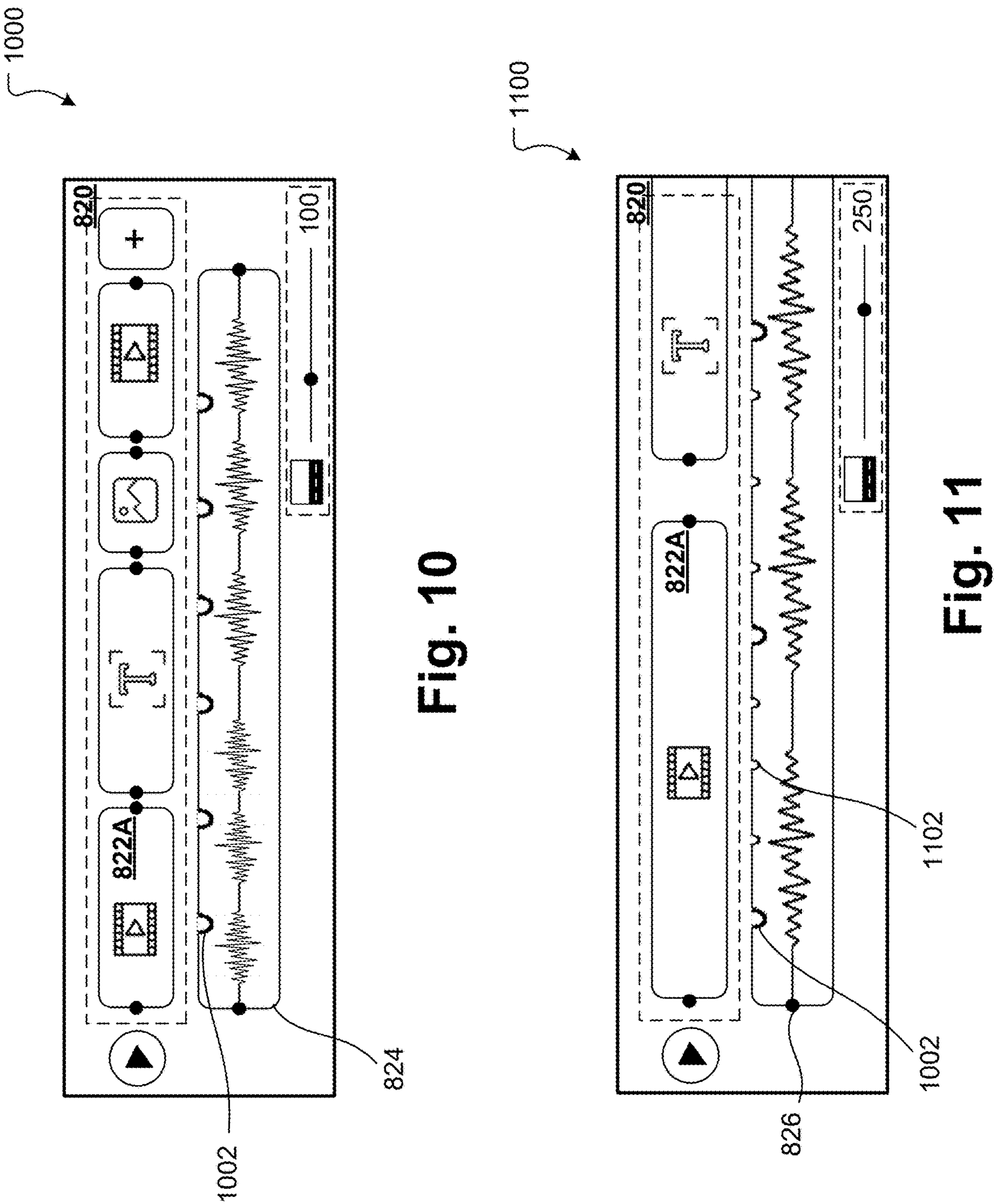
FIG. 10 depicts an example timeline portion of the digital visual production user interface of FIG. 8 showing downbeats.
FIG. 11 depicts an example timeline portion of the digital visual production user interface of FIG. 8 showing all beats in an audio element.

In particular, FIG. 10 shows a partial version 1000 of UI 800 of FIG. 8 (with only the timeline region 820 depicted). As shown in FIG. 10, the audio timeline 824 now includes downbeat markers 1002 that indicate the timing information of downbeats within the corresponding audio element. In some embodiments, the display of the beat markers (e.g., downbeat markers 1002 and/or non-downbeat makers 1102) can be toggled on/off using a suitable mechanism, e.g., the control 842.

Returning to step 914, if at this step, the editing module 214 determines that the current zoom level of the timeline region 820 is above the threshold zoom level, the method proceeds to step 918, where the editing module 214 updates the audio timeline 824 to display beat markers for all the beats identified in the beat metadata. This is shown in FIG. 11.

In particular, FIG. 11 shows a partial version 1100 of UI 800 of FIG. 8 with an increased zoom level (e.g., zoom level 250). As shown in FIG. 11, the timescale of the scene timeline 822 and the audio timeline 824 has now increased (in comparison to the state displayed in partial UI 1000). Further, the audio timeline 824 now not only includes downbeat markers 1002, but also includes beat markers 1102 that indicate the timing information of other non-downbeats within the corresponding audio element. In the example displayed in FIG. 11, the audio element has a 4/4 bar and the UI 1100 displays two full bars of the audio element including one downbeat marker 1002 per bar and three non-downbeat markers 1102 per bar.

The UI 1100 can visually distinguish between downbeats and other beats (also referred to as non-downbeats herein). In this example, the downbeat markers 1002 have a bigger size than the non-downbeat markers 1102. However, it will be appreciated that this is merely an example and that other visually distinguishable mechanisms may be adopted to allow the user to easily distinguish between beats and downbeats. These other visually distinguishable mechanism may include, e.g., using different colours for beat marker 1102 and downbeat markers 1002 (e.g., downbeat markers may be red in colour and non-downbeat markers may be blue in colour), using different shapes for beat marker 1102 and downbeat markers 1002 (e.g., downbeat markers may be triangular in shape whereas non-downbeat markers may be rectangular in shape), using different positions for beat markers 1102 and downbeat markers 1002 (e.g., downbeat markers can be displayed at the top of the audio timeline 824 whereas the beat markers can be displayed at the bottom of the audio timeline 824), etc.

By displaying beat markers 1102 in addition to downbeat markers 1002, aspects of the present disclosure allow users to synchronize scenes to not only downbeats but also non-downbeats in a bar thereby providing the user with greater flexibility in synchronizing scenes to the audio element.

On the other hand, by only displaying the non-downbeats at higher zoom levels, aspects of the present disclosure prevent cluttering in an already busy UI with additional information, which may increase the cognitive burden on the user in determining whether they have synchronized a scene to a downbeat or a nearby non-downbeat. Instead, the non-downbeat markers are displayed at higher zoom levels (or increased timescales) where the timeline is essentially stretched. This way the UI is not too cluttered and it is easy for a user to discern the difference between downbeats and non-downbeats (as they are further apart) and determine whether they have synchronized a scene to a downbeat or a nearby non-downbeat more accurately.

It will be appreciated that in some embodiments, the length of the audio element selected for the video production may be lesser than the length of the complete audio track (e.g., only a 30 s portion of a 1 minute 30 s audio track may be included in a production) and in other embodiments, the length of the audio element selected for the video product may be greater than the length of the complete audio track (e.g., when the audio track is only 30 s and the length of the element selected for the video production is 60 s). To account for such cases, at steps 916 and 918, the editing module 214 inspects the audio element record in the production dataset to determine the trim data (i.e., start and/or end trim point) of the audio element in the production. It then trims the beat metadata based on the offset and trim of the audio track to include beat metadata for the portion of the audio track selected in the production before displaying beat markers. If trimmed portions of an audio track are played multiple times, the editing module 214 edits the beat metadata to first trim the beat metadata based on the offset and trim values in the audio element record and then repeat that beat metadata for the number of repetitions included in the audio element record. This way, only the beat markers that are associated with the audio element in the production are displayed in the timeline.

Figure 12:
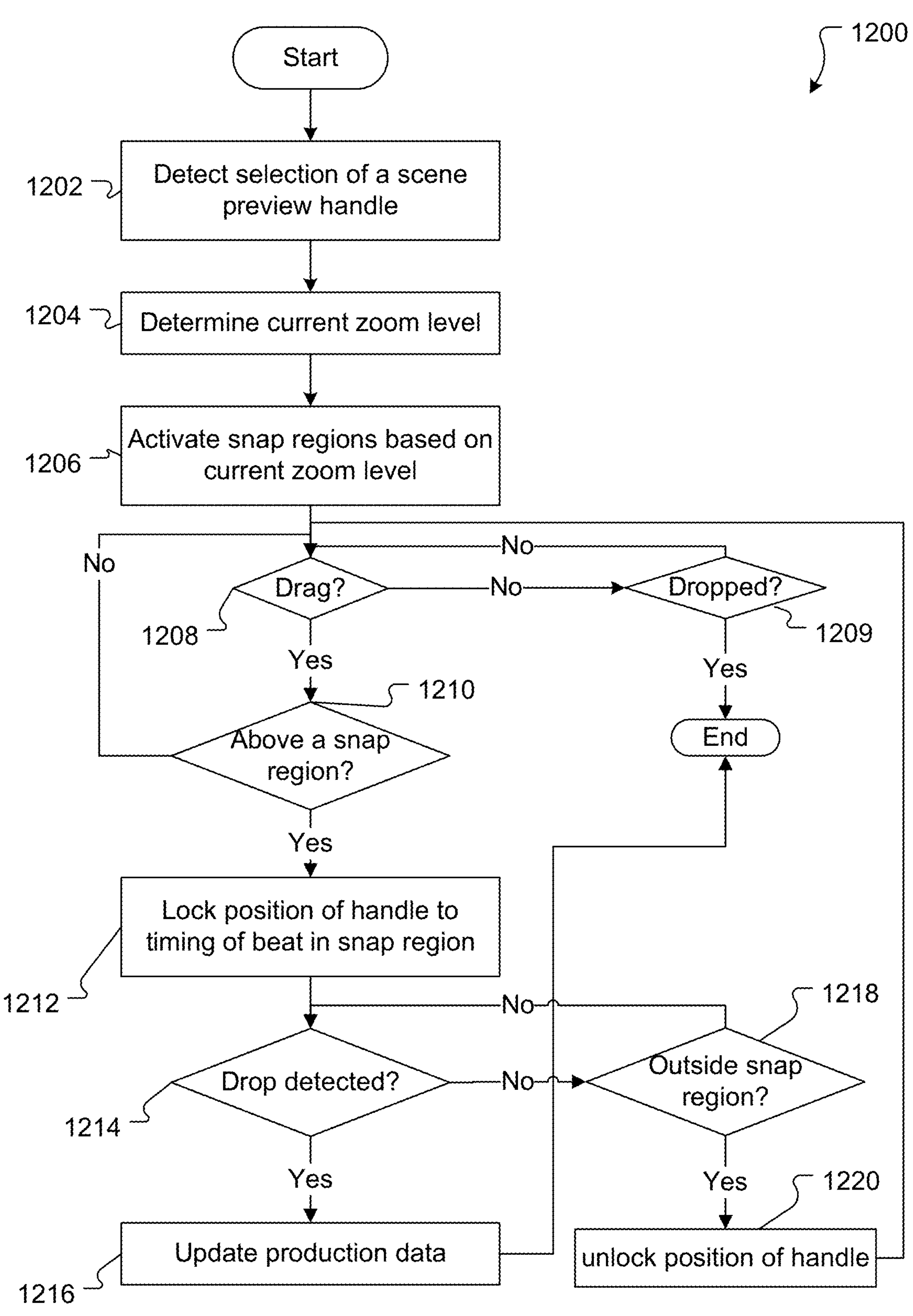
FIG. 12 depicts a portion of the timeline portion of the digital visual production user interface of FIG. 8 showing an example snap region.

FIG. 12 is a flowchart illustrating an example method for manually synchronizing scenes to beats in the audio element using the UIs 800, 1000 and/or 1100.

The method 1200 commences at step 1202, where the editing module 214 detects selection of a scene handle 826. For example, the editing module 214 may detect that a user has selected an end handle 826 of a scene preview (e.g., scene preview 823A) using a suitable input control means and is attempting to drag that end handle 826.

The editing module 214 then (at step 1204) determines the current zoom level of the timeline region 820. As described previously, the zoom levels may be stored as UI data in memory managed by the editing module 214. The editing module 214 can inspect the zoom level values from this stored UI data.

Next, at step 1206, the editing module 214 activates snap regions in the scene timeline 822 for beat markers based on the determined zoom level. For example, if the zoom level is determined to be above a threshold value, the editing module 214 activates snap regions associated with downbeat beat markers 1002 and non-downbeat markers 1102. Alternatively, if the zoom level is determined to be below a threshold value, the editing module 214 only activates snap regions associated with downbeat markers 1002.

A snap region can be defined as a "droppable area" of a UI where "draggable" objects can be dropped using a drag and drop operation. The snap region or droppable area is usually larger than a specific position it is associated with. When a draggable object is dragged into a snap region or dropped into a snap region, the dragged object aligns or "snaps" to the specific position associated with the snap region. This allows user to be imprecise when trying to align a draggable object to the specific position, but still being able to precisely align the draggable object to the specific position.

In the present case, snap regions may be activated in the scene timeline 822 in positions, which are in-line with the displayed beat markers (specific positions) in the audio timeline 824. An example snap region is displayed in FIG. 13.

Figure 13:
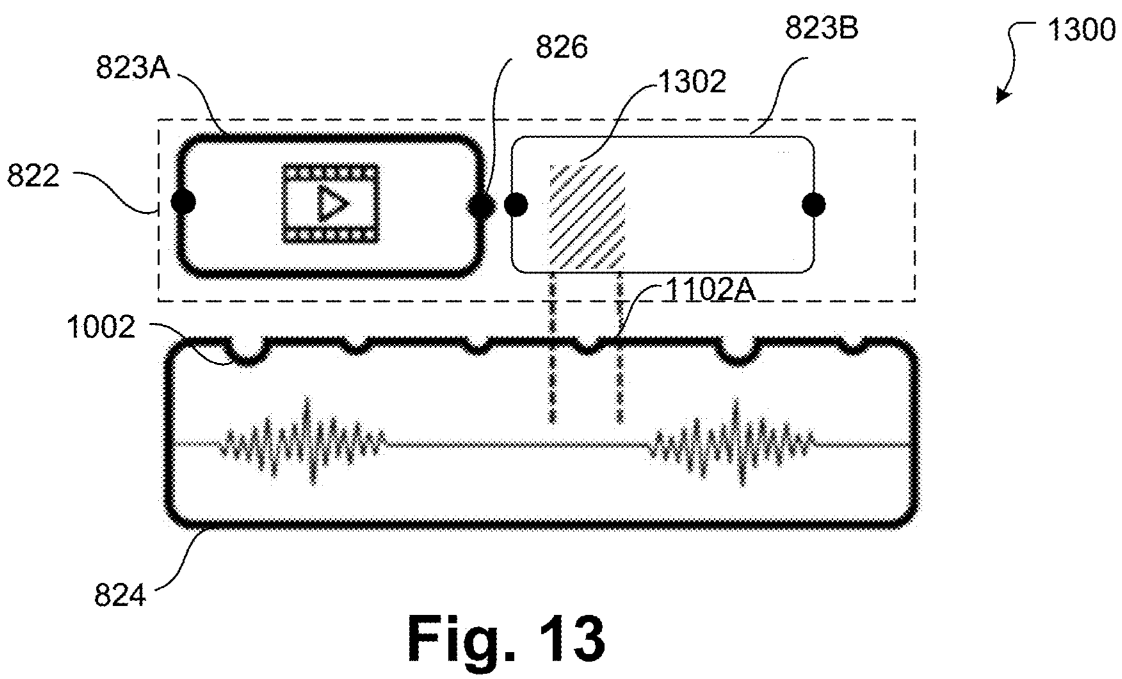
FIG. 13 depicts a portion of the timeline portion of the digital visual production user interface of FIG. 8 showing a scene preview that is dragged into a snap region.

In particular, FIG. 13 depicts a snap region 1302 in the scene timeline 822 associated with a beat marker (e.g., beat marker 1102A). As can be seen in this figure, the snap region 1302 is within the scene timeline 822 and in particular in line with the handles 826 of the scene previews 823. Further, the snap region 1302 extends over a greater area than the corresponding beat marker 1102A it is associated with. The area of the snap region can be configured. It will be appreciated that at step 1204 such snap regions 1302 are activated in the scene timeline 822 in alignment with each of the displayed beat markers (downbeat and/or non-downbeat markers) in the audio timeline 824.

At step 1208, the editing module 214 determines whether a dragging operation is detected of the selected scene handle 826. If the editing module 214 does not detect dragging of the end scene handle 826, the method proceeds to step 1209 where the editing module 214 determines whether the user has dropped/deselected the handle 826. If the editing module 214 does not detect deselection/drop, the method reverts to step 1208. Otherwise, the editing module 214 determines whether the position of the handle has changed at all from the starting position. If not (e.g., in case the user drops the handle before moving), the method 1200 ends at this stage and the snap regions are deactivated. Alternatively, if the position has changed, e.g., because the user moved the handle and dropped the handle in a non-snap region of the scene timeline 822, the scene preview 823A is extended to the position at which the handle is dropped (and the production dataset is updated according) and the method 1200 ends. In this case, the transition between that selected scene and the next scene is not synchronized to any beats in the audio timeline 824.

Alternatively, if at step 1208, the user moves the input control means while the handle 826 is selected, the editing module 214 determines that a drag operation is in motion and it may commence animating the selected scene preview by either increasing its width if the user drags the end handle 826 away from the scene preview 823A or decreasing the width of the scene preview if the user drags the end handle 826 towards the scene preview 823A.

At step 1210, the editing module 214 determines whether the handle 826 is above an active snap region 1302. If the cursor is determined to be above a snap region 1302, the method proceeds to step 1212 where the editing module 214 locks the position of the end handle 826 and consequently the end of the scene preview 823A to the corresponding beat marker until the handle 826 is dragged out of this region 1302.

To signify to the user that the position of the handle 826 and the end of the scene preview 823A has been locked in time to the corresponding beat marker, feedback may be present to the user in a number of ways. In one example, the beat marker 1102A corresponding to the snap region 1302 may be animated—e.g., by increasing/decreasing its size, changing its colour back and forth, changing its shape back and forth, etc. In one specific example, the animation may be depicted as a bounce in the corresponding beat marker. Alternatively, the feedback may be provided in a haptic fashion—e.g., by providing a vibration on the client system 210 or input control.

Next (at step 1214), the editing module 214 determines if a drop is detected. If a drop is detected while the cursor control is over the snap region 1302, the method proceeds to step 1216 where the editing module 214 snaps the handle 826 to the precise location of the beat marker 1102A corresponding to the snap region 1302. The position of any scene previews that were previously in the location of the cursor when the handle 826 is dropped are adjusted.

Figure 14:
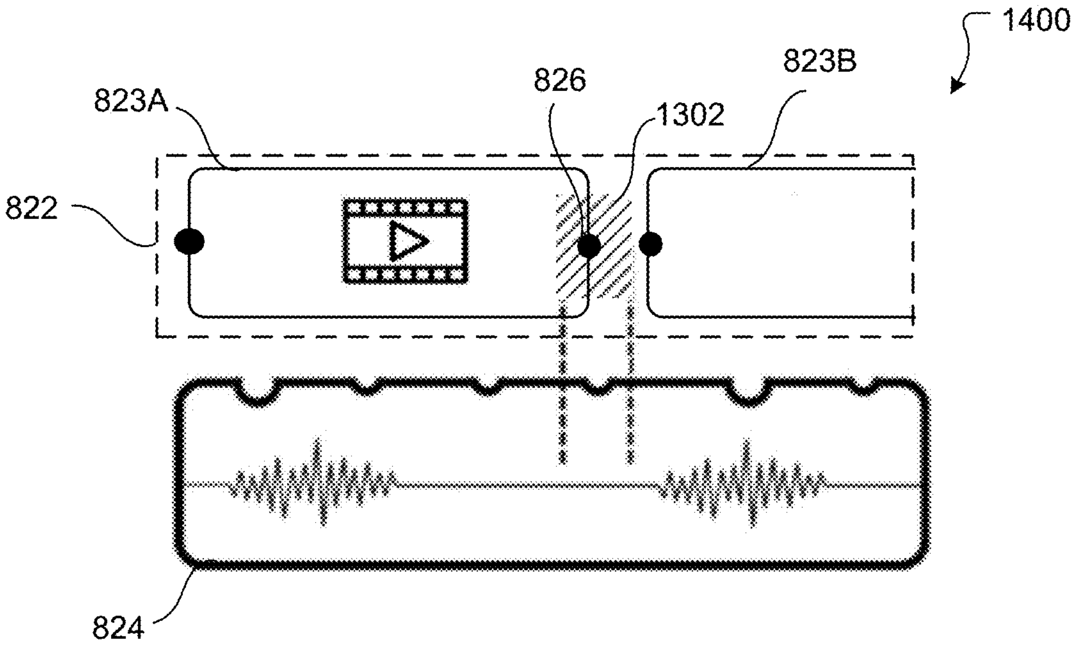
FIG. 14 is a flowchart depicting an example method for manually synchronizing a scene in a visual production to a beat in an associated audio element according to aspects of the present disclosure.

For example, as shown in FIG. 14, if the handle 826 of scene preview 823A is dragged right to the snap region 1302, the scene preview 823B is also adjusted rightwards. When the end handle 826 is dropped in the snap region 1302, the end handle 826 of scene preview 823A and the beginning handle 826 of scene preview 823B are locked to the corresponding beat marker (albeit with a visible interval 829), such that the transition between those two scenes (that is the end timing of the scene corresponding to scene preview 823A and the start timing of the scene corresponding to the scene preview 823B) are synchronized with the corresponding beat.

The editing module 214 may then update the video production dataset such that the scene duration and/or end timing of the dragged scene preview 823A and the scene duration and/or start timing of any other scenes that are adjusted in the scene timeline 822 are updated such that the transition between the two scenes is at the exact timing of the corresponding beat in the audio element. It will be appreciated that in some embodiments, the width of the next scene preview in the timeline may be maintained. In such cases, the duration of the next scene may not be updated, but the start and/or end timings of the next scene have changed.

Further, to indicate to the user that the transition between the two scenes has been synchronized with the corresponding beat, feedback may be present to the user in a number of ways. In one example, the beat marker 1102 corresponding to the snap region 1302 may be animated—e.g., by increasing/decreasing its size, changing its colour back and forth, changing its shape back and forth, etc. In one specific example, the animation may be depicted as a bounce in the corresponding beat marker. Alternatively, the feedback may be provided in a haptic fashion—e.g., by providing a vibration on the client device or input control.

Returning to FIG. 12, if at step 1214, a drop is not detected in the snap region 1302 and the editing module 214 detects that the handle 826 has been dragged outside the snap region 1302 (e.g., at step 1218), the method proceeds to step 1220 where the editing module unlocks the position of the handle 826 in time from the corresponding beat marker 1102A. This transition may also be indicated to the user via a visual and/or haptic feedback.

Thereafter, the method reverts to step 1208. If the user drops the handle 826 at a position along the scene timeline 822 that does not correspond to a snap region 1302 (e.g., step 1209), the scene preview 823A is extended to the position at which the handle is dropped (and the production dataset is updated according) and the transition between that selected scene and the next scene is not synchronized to any beats in the audio timeline 824.

Alternatively, if the user continues dragging the handle 826 until the handle is in the previous snap region or any other snap region, the method reverts to step 1210.

Once the editing module 214 detects that the handle has been dropped (in a snap region or outside), it may deactivate the snap regions. If the user then reselects the handle or any other handle, method 1200 may recommence.

Although FIG. 12 is described with the example of an end handle of a scene preview being dragged and synchronized with a snap region, it will be appreciated that this is merely an example. The start handle of a scene preview may also be dragged and synchronized with any active snap regions. Further, the start or end handles may be dragged in the backward or forward directions in the scene timeline 822 to crop/trim the corresponding scene to synchronize with a beat marker or extend the corresponding scene to synchronize with a beat marker.

It will be appreciated that the user can perform method 1200 multiple times until the user is satisfied that transitions between scenes are synchronized with beat markers (e.g., downbeat markers 1002 or non-downbeat markers 1102). It will be appreciated that during this process the user may change the zoom level of the timeline region and therefore the snap regions activated in the scene timeline 822 may vary sometimes during the process. That is, if the user increases the zoom level to above the threshold zoom level before selecting a handle, the editing module 214 activates snap regions 1302 in the scene timeline 822 corresponding to downbeat markers and non-downbeat markers when executing method 1200. However, if the user decreases the zoom level below the threshold zoom level before selecting a handle, the editing module 214 may deactivate any snap regions 1302 associated with non-downbeats and only maintain snap regions 1302 associated with downbeats at this zoom level.

Accordingly, by varying the zoom level during the manual synchronization process, the user can change the snap regions 1302 activated in the scene timeline 822 for synchronization. In particular, at higher zoom levels, the user is able to precisely synchronize with non-downbeats of an audio element (by utilizing snap regions 1302 associated with non-downbeat markers 1102) and at lower zoom levels, the user is able to precisely synchronize with downbeats of the audio element (by utilizing snap regions 1302 associated with downbeat markers 1002) without requiring much accuracy from the user in aligning transitions to beats (downbeats or non-downbeats).

Figure 15:
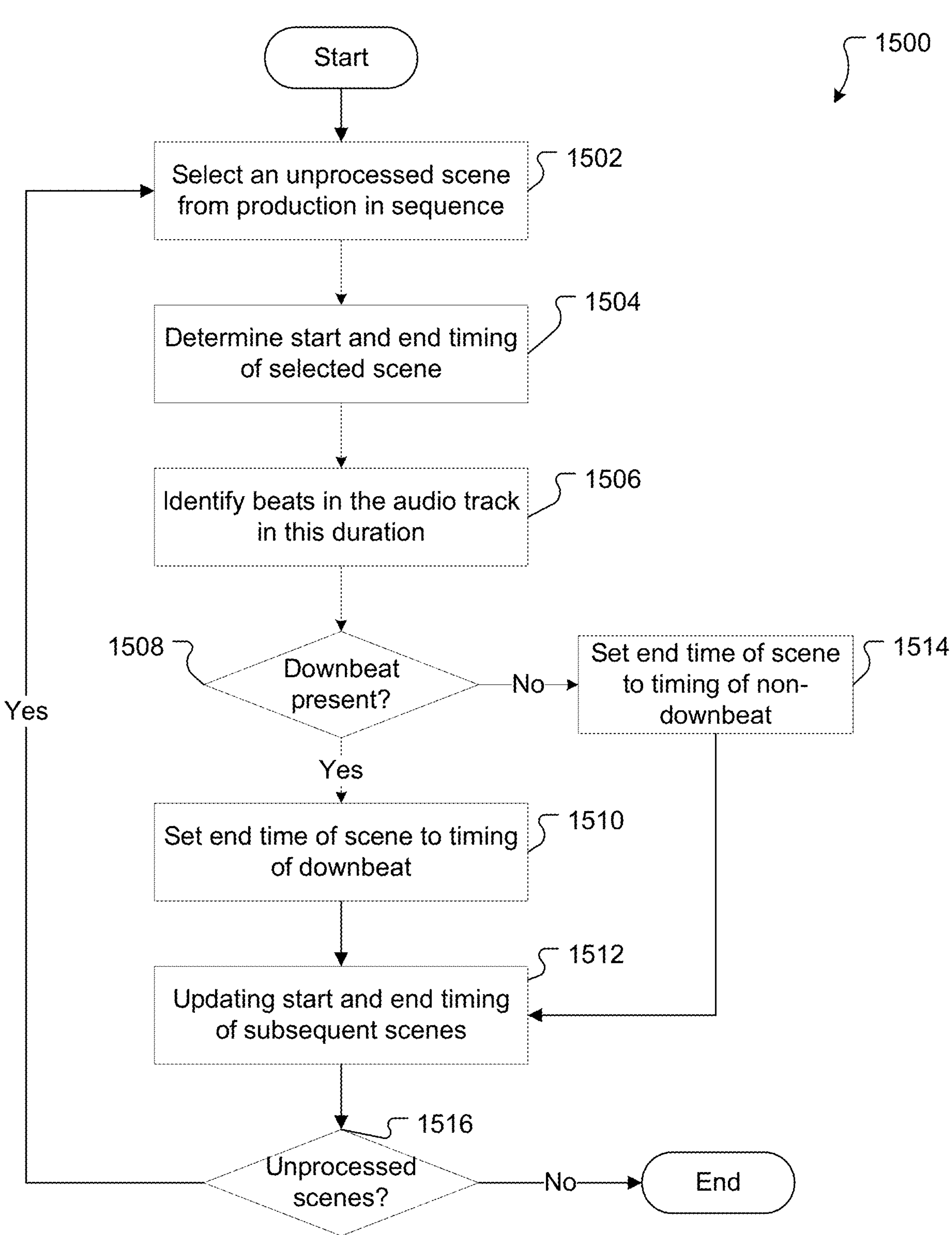
FIG. 15 is a flowchart depicting an example method for automatically synchronizing multiple scenes in a visual production to beats in an associated audio element according to aspects of the present disclosure.

FIG. 15 is a flowchart illustrating an example method performed by the editing module 215 to automatically synchronize multiple scenes in a production to beats in the associated audio element.

The method may be triggered when a user selects the control 844 to automatically synchronize the scenes in the production to the beats of the music. In other embodiments, the system may perform this method automatically when beat markers are displayed or when beta metadata is available for the audio element.

The method 1500 commences at step 1502, where the editing module 214 selects an unprocessed scene from the production. An unprocessed scene as used herein refers to a scene that has not previously been selected and has not already been synchronized to a beat by method 1500. In some embodiment, the editing module 214 selects unprocessed scenes in order-starting with the first scene in the production and then proceeds by sequentially selecting the next unprocessed scenes in the production. To determine the order of the scenes, the editing module 214 inspects the scene data field in the associated production dataset, in some examples.

At step 1504, the editing module 214 determines the start and end timing of the selected scene. To do this, the editing module 214 inspects the scene record in the production dataset for the selected scene. If the scene record includes the start and end timing information, the editing module 214 directly retrieves this information from the scene record. Alternatively, if the scene record does not include one or more of these values and instead stores the scene duration, the editing module 214 may calculate the start and/or end timing based on the duration and the sequence number of the scene. That is, it can calculate the selected scene's start time by adding together the durations of all preceding scenes and calculate the end time by adding its duration to its start time.

For example, if the selected scene is the first scene and its duration is 2 seconds, the start time of the scene is 0 s and the end time is 2 s. Alternatively, if the selected scene is the next scene and its duration is 3 seconds, the start time of the scene can be calculated as 2 s (duration of first scene) and the end time of the scene can be calculated as 5 s (start time of second scene+duration of the second scene). It will be appreciated that if a scene has an outro transition, the duration of that outro transition is not generally included in the duration of the scene and the duration of the outro transition of any previous scenes should be added to the duration of the previous scenes when determining the start time of a next scene in a sequence.

Next, at step 1506, the editing module 214 determines the beats (downbeats and/or non-downbeats) in the audio element that fall within the timing of the selected. To do this, the editing module 214 retrieves the beat metadata associated with the audio element and identifies the portion of the beat metadata that corresponds to the duration of the selected scene. As described previously, the beat metadata includes the timing of each beat in the audio element (i.e., its timing with respect to a start time, such as 0 s) and its relative position in a bar. Accordingly, the editing module 214 identifies the beats in the audio element that occur during the duration of the selected scene. Using the two examples above, if the first scene is selected, the editing module identifies the beats that have a timing between the first 0 and 2 seconds. If the second scene is selected, the editing module 214 identifies the beats that have a timing between 2 and 5 seconds of the audio element.

At step 1508, the editing module 214 determines whether any downbeats are present in the beats identified at step 1506. This can be determined by inspecting the position information of the identified beats. If any of the beats have a position of 1 in a bar, they are considered downbeats and beats that have any other position information are considered non-downbeats.

If at step 1508, the editing module 214 determines that at least one downbeat is present in the beats identified at step 1506, the method proceeds to step 1510, where the editing module sets the end time of the selected scene to the timing of the downbeat. Again, using the two examples discussed above, if the first scene is selected, and the editing module identifies a downbeat having a timing of 1.5 s, it sets the end time of the selected scene to 1.5 s. Similarly, if the second scene is selected and the editing module 214 identifies a downbeat having a timing of 4 s, it sets the end time of the selected scene to 4 s.

To do so, the editing module 214 updates the scene record to either update the end time of the scene (if this field is included in the scene record) or updates the duration of scene (if this field is included in the scene record). It also updates the display of the corresponding scene preview in UI 800, such that the new duration of the scene is reflected in the scene preview 823.

It then proceeds to step 1512, where the editing module 214 updates the start and end timing of subsequent scenes (if this information is present in the corresponding scene records). If the start and end timing information is not present in the scene records, this step is omitted.

Returning to step 1508, if at this step, the editing module 214 determines that there are no downbeats in the identified beats, the method proceeds to step 1514 where the editing module 214 sets the end time of the scene to the timing of a non-downbeat. If multiple non-downbeats are present, in some embodiments, the editing module 214 may select the non-downbeat that results in the least amount of scene trimming—i.e., the last identified non-downbeat that falls within the duration of the selected scene. Alternatively, it may select the first non-downbeat in that falls within the duration of the selected scene or any of the non-downbeats at random.

Thereafter, the method proceeds to step 1512.

At step 1516, the editing module 214 determines if any unprocessed scenes remain in the production. If it determines that unprocessed scenes remain, the method reverts to step 1502 and the next unprocessed scene is selected. Otherwise, the method 1500 ends.

It will be appreciated that in some cases no beat may fall within the duration of a selected scene. In such cases, instead of trimming the scene, the editing module 214 may increase the duration of the scene to match the timing of the next downbeat or non-downbeat in the beat metadata. In other embodiments, if no beats are found in the duration of the selected scene, no changes may be made to the duration of the scene and the method may proceed to assess and process the next scene in the time-ordered sequence.

Further still, in some cases, multiple downbeats may be present in the beats identified at step 1508. In such cases, the editing module 214 may be configured to select the first downbeat, the last downbeat, or any random downbeat from the identified beats without departing from the scope of the present disclosure. In some embodiments, it selects the last downbeat or non-downbeat as this results in the least amount of scene trimming.

In some embodiments, the automatic synchronization process 1500 may take the current zoom level of the timeline region into consideration when performing the automatic synchronization. For example, if the zoom level of the timeline region is set above the threshold zoom level (such that downbeats and non-downbeat markers can or are displayed), the method may attempt to synchronize the transitions between scenes and the end timings of the selected scene to the timing of a downbeat (if present) or a non-downbeat (if downbeat not present) that occurs during the duration of the selected scene. However, if the zoom level of the timeline region is set below the threshold zoom level (such that only downbeats can or are displayed), the method may attempt to synchronize the transitions between scenes and the end timings of the selected scene to only the timing of downbeats. If downbeats are not present during the duration of the selected scene, the process may either proceed to select the next scene for processing without updating the duration of the selected scene or it may attempt to align or set the end timing of the selected scene to a first downbeat identified outside the duration of the selected scene. It will be appreciated that in this embodiment, the method does not synchronize end timing of scenes with the timing of any non-downbeats in the audio element.

Figure 16:
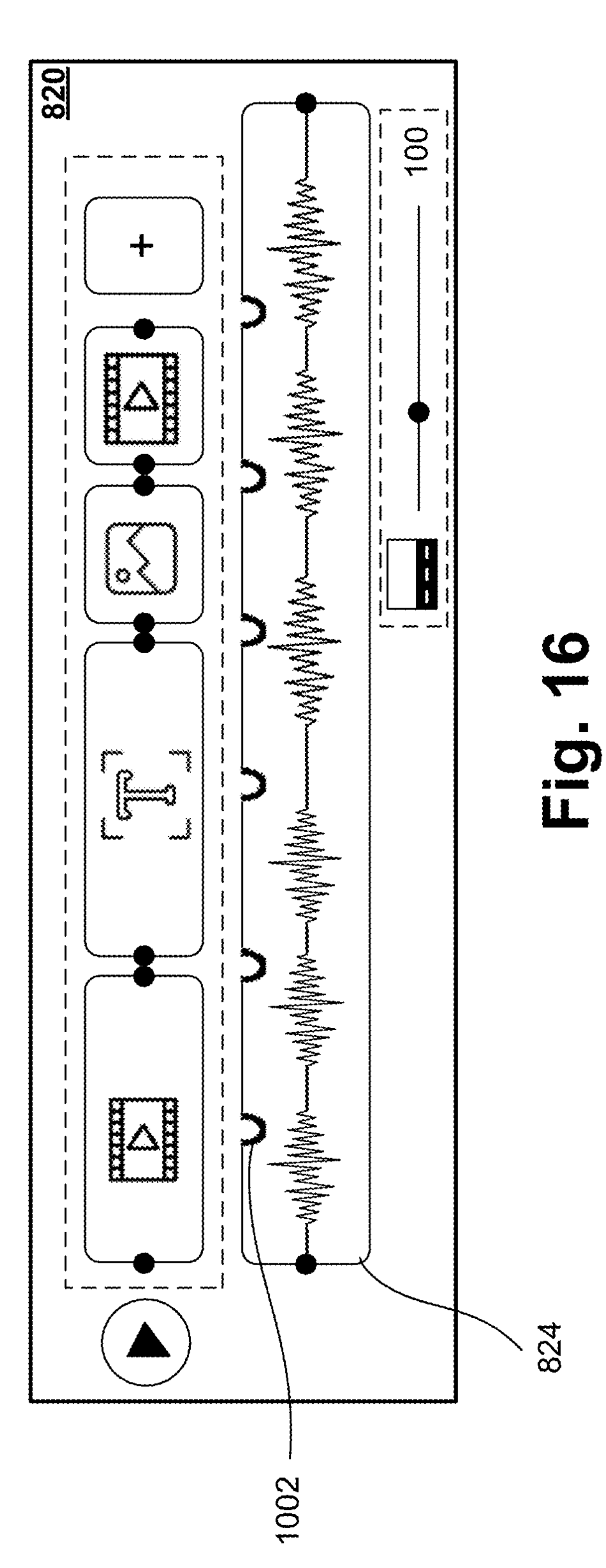
FIG. 16 depicts an example timeline portion of the digital visual production user interface of FIG. 10 after the method of FIG. 15 is performed.

FIG. 16 illustrates the partial UI of FIG. 10 after automatic beat synchronization is applied to the scenes. As can be seen in the example partial UI 1600, all the transitions between the scene previews are synchronized or aligned with downbeat markers 1002 in the audio timeline 824. Further, the duration (in time) of some of the scenes has been reduced such that their transitions can be aligned with the beats in the audio element.

Further examples of specific feature combinations taught within the present disclosure are set out in the following sets of numbered clauses—

Clause A1. A computer-implemented method, comprising: converting an audio object into a plurality of chunks, where the plurality of chunks comprises a first chunk and two or more second chunks, wherein each of the two or more second chunks includes an overlap region in a first portion of the chunk, processing each chunk in the plurality of chunks to identify beats in the chunk and whether the beats are downbeats or non-downbeats; and generating beat metadata associated with each of the plurality of chunks based on the identified beats in each of the plurality of chunks, the beat metadata for each chunk including data indicating a timing of each beat in the audio object and whether each beat is a downbeat or non-downbeat.

Clause A2. The method of clause A1, further comprising: combining the beat metadata associated with each of the plurality of chunks to generate the beat metadata for the audio object; and communicating the beat metadata for the audio object to a client device, the client device configured to display beat markers based on the beat metadata in a visual production user interface in association with a waveform representative of at least a portion of the audio object.

Clause A3: The computer-implemented method of clause A2, wherein: the client device is configured to display different beat markers for downbeats and non-downbeats.

Clause A4: The computer-implemented method of clause A1, wherein the audio object is a live audio object and the live audio object is received as a stream of data from a client device.

Clause A5: The computer-implemented method of clause A4, wherein the processing of each chunk in the plurality of chunks is performed sequentially.

Clause A6: The computer-implemented method of any one of clauses A4-A5, wherein: communicating the beat metadata to the client device comprises communicating the beat metadata associated with each chunk of the plurality of chunks sequentially after the corresponding chunk has been processed.

Clause A7: The computer-implemented method of any one of clauses A1-A6, wherein identifying beats in a chunk comprises: using a first neural network to extract features from the audio object; using a second neural network to estimate likelihood of the beats based on the extracted features of the audio object; and using a third neural network to determine a position of the beats based on the estimated likelihood of the beats and whether each beat is a downbeat or non-downbeat.

Clause A8: The computer-implemented method of clause A7, wherein each of the first, second and third neural networks are trained using respective computational graphs.

Clause A9: The computer-implemented method of any one of clauses A1-A8 wherein for the first chunk in the plurality of chunks, determining a position of the beats comprises: performing a Viterbi algorithm on the estimated likelihood of beats in a forward direction to obtain a first determination of the position of the beats in the first chunk, and in a reverse direction to obtain a second determination of the position of the beats in the first chunk; and generating a combined determination of the position of the beats in the first chunk by discarding data about the position of the beats from the first determination for a first half of the first chunk and discarding data about the position of the beats from the second determination for a second half of the first chunk.

Clause A10: The computer-implemented method of any one of clauses A1-A9, wherein for each chunk of the one or more second chunks in the plurality of chunks, determining the position of the beats comprises: performing a Viterbi algorithm on the estimated likelihood of beats in a forward direction to obtain a determination of the position of the beats in the chunk; and discarding data about the position of the beats from the determination for the overlapping region.

Clause A11: The computer-implemented method of any one of clauses A1-A3 or A7-A10, wherein multiple chunks of the plurality of chunks are processed concurrently.

Clause A12: The computer-implemented method of any one of the preceding clauses, wherein a length of each of the chunks in the plurality of chunks is the same.

Clause A13: The computer-implemented method of any one of clauses A1-A11 wherein a length of the chunks in the plurality of chunks varies.

Clause A14: The computer-implemented method of any one of the preceding clauses, wherein a length of the overlap regions in the one or more second chunks is the same.

Clause A15: The computer-implemented method of any one of clauses A1-A14 wherein a length of the overlap regions in the one or more second chunks varies.

Clause A16: The computer-implemented method of any one of clauses A7-A11, wherein extracting features comprises converting the corresponding chunk into a time-frequency representation or a frequency representation.

Clause A17: The computer-implemented method of clause A16, wherein the corresponding chunk is converted into the time-frequency representation using a Short-Time Fourier Transform (STFT) or converted into the frequency representation using a Discrete Fourier Transform (DFT) or a Fast Fourier Transform (FFT).

Clause A18: The computer-implemented method of any one of clauses A7-A17, wherein the first, second, and/or third neural networks are recurrently neural networks.

Clause B1: A computer-implemented method for displaying beat markers in a visual production user interface, the method comprising: displaying, on a display, the visual production user interface including a timeline region, the timeline region including: an audio timeline including a waveform representation of an audio element associated with a visual production; determining a zoom level of the timeline region at a first time; in response to determining that the zoom level of the timeline region is above a threshold zoom level at the first time, displaying downbeat and non-downbeat markers in the audio timeline, the downbeat and non-downbeat markers indicating positions of downbeats and non-downbeats respectively in the audio element; and in response to determining that the zoom level of the timeline region is below a threshold zoom level at the first time, displaying downbeat markers in the audio timeline without displaying non-downbeat markers.

Clause B2: The computer-implemented method of clause B1, wherein the downbeat markers are visually distinguishable from the non-downbeat markers.

Clause B3: The computer-implemented method of clause B2, wherein the downbeat markers are larger in size than the non-downbeat markers.

Clause B4: The computer-implemented method of any one of clauses B1-B3, further comprising: determining the zoom level of the timeline region at a second time after the first time; in response to determining that the zoom level of the timeline region is above a threshold zoom level at the second time but was below the threshold zoom level at the first time, additionally displaying non-downbeat markers in the audio timeline; and in response to determining that the zoom level of the timeline region is below a threshold zoom level at the second time but was above the threshold zoom level at the first time, removing display of the non-downbeat markers from the audio timeline.

Clause B5: The computer-implemented method of any one of clauses B1-B4, wherein the timeline region further comprising: a scene timeline including a time-ordered sequence of scene previews, each scene preview corresponding to a scene of two or more scenes and having a display width that provides a visual indication of a duration of the corresponding scene.

Clause B6: The computer-implemented method of clause B5 further comprising: accessing production data in respect of a visual production, the production data including: scene data defining the two or more scenes of the visual production, visual element data defining one or more visual elements of the visual production, each visual element being associated with a scene of the two or more scenes, and audio data defining the audio element associated with the visual production;

Clause B7: The computer-implemented method of any one of clauses B1-B6, further comprising: determining whether beat metadata exists for an audio track associated with the audio element, the beat metadata including data indicating a timing of each beat in the audio track and whether each beat is a downbeat or non-downbeat; and retrieving the beat metadata for the audio track upon determining that the beat metadata exists for the audio track.

Clause B8: The computer-implemented method of any one of clauses B1-B6, further comprising: determining whether beat metadata exists for an audio track associated with the audio element, the beat metadata including data indicating a timing of each beat in the audio track and whether each beat is a downbeat or non-downbeat; upon determining that beat metadata does not exist for the audio track requesting generation of the beat metadata; and receiving the generated beat metadata.

Clause B9: The computer-implemented method of any one of clauses B6-B8, further comprising: inspecting the beat metadata to determine the timing of downbeats and non-downbeats in the audio element; and displaying the downbeat markers and/or non-downbeat markers at positions in the audio timeline based on the determined timing.

Clause B10: The computer-implemented method of any one of clauses B7-B9, wherein the audio data defining the audio element comprising: one or more of an identifier of the audio track, trim data including start and/or end trim points that define a portion of the audio track that is played in the audio element, and/or loop data indicating a number of times the audio track is repeated in the audio element.

Clause B11: The computer-implemented method of clause B10, further comprising: inspecting the trim data to determine the start and/or end trim points of the audio element; and trimming the beat metadata based on the start and/or end trim points of the audio element to discard beat information of the audio track that is not associated with the audio element.

Clause B12: The computer-implemented method of clause B10 or B11, further comprising: inspecting the loop data to determine the number of times the audio track is repeated in the audio element; and updating the beat metadata by repeating the beat information based on the number of times the audio track is repeated.

Clause B13: The computer-implemented method of any one of clauses B1-B12, further comprising: displaying a design region in the visual production user interface; detecting selection of a first scene preview from the scene timeline, the first scene preview associated with a first scene of the two or more scenes; in response to detecting selection of the first scene preview, displaying a canvas including a first visual element that is associated with the first scene in the design region.

Clause B14: The computer-implemented method of clause B13, wherein the visual production user interface comprising a zoom control to control a zoom level of the visual production user interface.

Clause B15: The computer-implemented method of clause B14, wherein the zoom control includes a region selector for selecting the design region or the timeline region, wherein selection of the design region or the timeline region in the zoom control causes the zoom level of the selected region to be altered without altering the zoom level of the unselected region.

Clause B16: The computer-implemented method of any one of clauses B1-B15, further comprising: displaying a control to display beat markers in the visual production user interface; detecting activation of the control; and determining the zoom level of the timeline region at the first time after detecting activation of the control.

Clause C1: A computer-implemented method, comprising: displaying, on a display, a visual production user interface including a timeline region, the timeline region including: a scene timeline, the scene timeline including a time-ordered sequence of scene previews, each scene preview corresponding to a scene of two or more scenes of a visual production and having a display width that provides a visual indication of a duration of the corresponding scene; an audio timeline including a waveform representation of an audio element associated with the visual production; detecting selection of a first scene preview; determining a zoom level of the timeline region at a first time; and in response to determining that the zoom level of the timeline region is above a threshold zoom level at the first time, activating snap regions in the scene timeline that correspond to positions of downbeats and non-downbeats in the audio element; and in response to determining that the zoom level of the timeline region is below the threshold zoom level at the first time, activating snap regions in the scene timeline that correspond to the positions of downbeats in the audio element.

Clause C2: The computer-implemented method of clause C1, wherein a width of each snap region is greater than the timing of the downbeat or non-downbeat marker associated with the corresponding snap region.

Clause C3: The computer-implemented method of any one of clauses C1-C2, further comprising: displaying downbeat markers and non-downbeat markers in the audio timeline if the zoom level of the timeline region is above the threshold zoom level, the downbeat and non-downbeat markers indicating positions of downbeats and non-downbeats respectively in the audio element; and displaying downbeat markers in the audio timeline without displaying non-downbeat markers if the zoom level of the timeline region is below the threshold zoom level.

Clause C4: The computer-implemented method of clause C3, wherein the downbeat markers are visually distinguishable from the non-downbeat markers.

Clause C5: The computer-implemented method of any one of clauses C1-C4, wherein each scene preview in the scene timeline includes at least one handle, the handle being selectable and draggable to increase or decrease the display width of the corresponding scene preview.

Clause C6: The computer-implemented method of clause C5, wherein detecting selection of the first scene preview comprising detecting selection of a handle of the first scene preview.

Clause C7: The computer-implemented method of any one of clauses C1-C6 further comprising: accessing production data in respect of the visual production, the production data including scene data defining the two or more scenes of the visual production, the scene data of each scene comprising at least a duration of the corresponding scene.

Clause C8: The computer-implemented method of any one of clauses C3-C7 further comprising: detecting dragging of the handle of the first scene preview within the scene timeline, wherein the dragging of the handle causes the width of the scene preview to increase or decrease depending on a direction of the dragging; detecting position of the handle above a first snap region; and locking a position of the handle to a timing of a downbeat or non-downbeat that is associated with the first snap region.

Clause C9: The computer-implemented method of clause C8, wherein locking the position of the handle to the timing of the downbeat or non-downbeat associated with the first snap region comprises providing visual or haptic feedback.

Clause C10: The computer-implemented method of clause C9, wherein the visual feedback is a bounce animation of the downbeat or non-downbeat marker associated with the downbeat or non-downbeat.

Clause C11: The computer-implemented method of any one of clauses C7-C10, further comprising: detecting a drop of the handle in the first snap region; and updating the scene data associated with the first scene preview, wherein updating the scene data comprises updating a duration of the scene based on the width of the scene preview at the time of detecting the drop.

Clause C12: The computer-implemented method of any one of clauses C7-C10, further comprising: detecting dragging of the handle of the first scene preview outside the first snap region; and unlocking the position of the handle from the timing of the downbeat or non-downbeat that is associated with the first snap region.

Clause C13: The computer-implemented method of clause C12, wherein unlocking the position of the handle from the timing of the downbeat or non-downbeat associated with the first snap region comprises providing visual or haptic feedback.

Clause C14: The computer-implemented method of any one of clauses C12-C13, further comprising: detecting a drop of the handle outside the first snap region; and updating the scene data associated with the first scene preview, wherein updating the scene data comprises updating a duration of the scene based on the width of the scene preview at the time of detecting the drop.

Clause C15: The computer-implemented method of any one of clauses C11 or C14, further comprising: deactivating the snap regions upon detecting the drop of the handle.

Clause C16: The computer-implemented method of any one of clauses C1-C15, further comprising: determining the zoom level of the timeline region at a second time after the first time; in response to determining that the zoom level of the timeline region is above a threshold zoom level at the second time but was below the threshold zoom level at the first time, activating additional snap regions corresponding to non-downbeats in the audio timeline; and in response to determining that the zoom level of the timeline region is below a threshold zoom level at the second time but was above the threshold zoom level at the first time, deactivating snap regions corresponding to non-downbeats in the audio timeline.

Clause C17: The computer-implemented method of any one of clauses C3-C16, further comprising: determining whether beat metadata exists for an audio track associated the audio element, the beat metadata including data indicating a timing of each beat in the audio track and whether each beat is a downbeat or non-downbeat; and retrieving the beat metadata for the audio track upon determining that the beat metadata exists for the audio track.

Clause C18: The computer-implemented method of any one of clauses C3-C16, further comprising: determining whether beat metadata exists for an audio track associated with the audio element, the beat metadata including data indicating a timing of each beat in the audio track and whether each beat is a downbeat or non-downbeat; upon determining that beat metadata does not exist for the audio track requesting generation of the beat metadata; and receiving the generated beat metadata.

Clause C19: The computer-implemented method of any one of clauses C17 or C18, further comprising: inspecting the beat metadata to determine the timing of the downbeats and the non-downbeats in the audio element; and displaying the downbeat markers and/or non-downbeat markers at positions in the audio timeline based on the determined timing.

Clause D1: A computer-implemented method, comprising: accessing production data in respect of a visual production, the production data including: scene data defining two or more scenes of the visual production, the scene data of each scene comprising at least a duration of the corresponding scene and an indication of a time-ordered sequence of the two or more scenes; audio data defining an audio element associated with the visual production; and accessing beat metadata associated with the audio element, the beat metadata including information about timing of beats in the audio element; for each scene in the two or more scenes, sequentially determining: determining whether one or more beats in the audio element occur during the duration of the scene; and setting an end timing of the scene to the timing of a beat of the one or more beats upon determining that the one or more beats in the audio element occur during the duration of the scene.

Clause D2: The method of clause D1, wherein the beats in the audio element comprise downbeats and non-downbeats and the beat metadata including an indication of whether a beat is a downbeat or a non-downbeat.

Clause D3: The method of clause D2, wherein determining whether the one or more beats in the audio element occur during the duration of the scene comprises determining whether one or downbeats occur during the duration of the scene and/or one or more non-downbeats occur during the duration of the scene.

Clause D4: The method of Clause D3, wherein setting the end timing of the scene to the timing of the beat includes setting the end timing of the scene to the timing of a downbeat of the one or more downbeats upon determining that one or more downbeats occur during the duration of the scene.

Clause D5: The method of Clause D3, wherein setting the end timing of the scene to the timing of the beat includes setting the end timing of the scene to the timing of a non-downbeat of the one or more non-downbeats upon determining that one or more downbeats do not occur during the duration of the scene but one or more non-downbeats occur during the duration of the scene.

Clause D6: The method of Clause D4, wherein setting the end timing of the scene to the timing of the downbeat comprises setting the end timing of the scene to a last downbeat that occurs during the duration of the scene.

Clause D7: The method of Clause D5, wherein setting the end timing of the scene to the timing of the non-downbeat comprises setting the end timing of the scene to a last non-downbeat that occurs during the duration of the scene.

Clause D8: The method of any one of Clauses D1-D7, further comprising: forgoing setting the end timing of the scene to the timing of a beat upon determining that no beats occur in the audio element during the duration of the scene.

Clause D9: The method of any one of clauses D1-D7, wherein upon determining that no beats occur in the audio element during the duration of the scene: identifying a first beat that occurs in the audio element beyond the duration of the scene; and setting the end timing of the scene to the timing of the first beat.

Clause D10: The method of clause D9, wherein the first beat is a first downbeat.

Clause D11: The method of clause D9, wherein the first beat is a first non-downbeat.

Clause D12: The method of any one of clauses D1-D11, further comprising: displaying, on a display, a visual production user interface including a timeline region, the timeline region including: a scene timeline, the scene timeline including a time-ordered sequence of scene previews, each scene preview corresponding to a scene of the two or more scenes of the visual production and having a display width that provides a visual indication of the duration of the corresponding scene; and an audio timeline including a waveform representation of the audio element associated with the visual production.

Clause D13: The method of clause D12, further comprising: displaying beat markers in the audio timeline, the beat markers indicating the timing of the beats in the audio element.

Clause D14: The method of clause D13, wherein an end timing of at least one scene preview in the scene timeline is aligned with a timing of a beat marker, the beat marker associated with the beat the end timing of the scene associated with the at least one scene preview has been set to.

Clause D15: The method of clause D13, wherein the beat markers include at least one of downbeat markers or non-downbeat markers, the downbeat and non-downbeat markers indicating positions of downbeats and non-downbeats respectively in the audio element.

Clause D16: The method of clause D15, further comprising: determining a zoom level of the timeline region at a first time; and displaying downbeat markers and non-downbeat markers in the audio timeline if the zoom level of the timeline region is above a threshold zoom level; and displaying downbeat markers in the audio timeline without displaying non-downbeat markers if the zoom level of the timeline region is below the threshold zoom level.

Clause D17: The computer-implemented method of clause D16, wherein the downbeat markers are visually distinguishable from the non-downbeat markers.

Clause D18: The computer-implemented method of any one of clauses 12-17, further comprising: detecting selection of an auto synchronization control displayed in the visual production user interface and wherein for each scene in the two or more scenes, the sequentially determining of whether one or more beats in the audio element occur during the duration of the scene; and the setting of the end timing of the scene to the timing of the beat of the one or more beats is performed in response to detecting the selection of the auto synchronization control.

Clause E1. A computer processing system including: one or more processing units; and one or more non-transitory computer-readable storage media storing instructions, which when executed by the one or more processing units, cause the one or more processing units to perform a method according to: any one of clauses A1 to A18; any one of clauses B1 to B16; any one of clauses C to C19; any one of clauses D1 to D18.

Clause E2. One or more non-transitory storage media storing instructions executable by one or more processing units to cause the one or more processing units to perform a method according to: any one of clauses A1 to A18; any one of clauses B1 to B16; any one of clauses C1 to C19; any one of clauses D1 to D18.

In the above, the editing module 214 is described as displaying (or causing display) of data/user interfaces/user interface elements and receiving user inputs. Display of data/UIs/UI elements is on one or more displays that are connected to or part of client system 210. Similarly, editing module 214 receives/detects user inputs via one or more user input device(s) that are connected to or part of client system 210. In one example, the client system 210 includes (or is connected to) a touch screen display 318 which both displays data and receives input (in the form of contacts and/or gestures made with respect to the touch screen display).

As described previously, during processing, the editing module 214 is configured to access and store production datasets 207. In the present example, the editing module 214 retrieves production datasets from the server system 202 and/or stores new production datasets in the server system 202. In this case, in order to store production dataset 207, the editing module 214 communicates the relevant data to the production application 203, which, in turn, causes the production data 207 to be stored in data store 206. The editing module 214 may alternatively (or additionally) store and/or retrieve production data in/from local memory of the client system 210, for example non-transitory memory 310. In this case, storing production data involves writing it to that memory. In some cases, the editing module 214 may be configured to initially store production data in local memory and only communicate production data to the server system 202 at certain times (e.g. automatically at defined intervals and/or manually as initiated by a user initiating a save operation).

In the present embodiments, audio elements are not associated with scenes (and do not impact scene duration). Nor are visual previews of audio elements provided in scene previews 823. Accordingly, on user interaction to delete an audio element the editing module 214 can delete the selected element's record from the audio element data (e.g. from the production dataset). If an audio timeline 824 is displayed, the editing module 214 also removes the audio timeline from the UI 800.

The foregoing description describes various user interactions—for example the selection, activation, interaction, or other manipulation of various user interface elements.

Generally speaking, a given UI element can be interacted with in various ways, and the particular interaction will depend on the type of UI element and the input device(s) available to client system 210.

For example, activation or selection of a particular UI control may be achieved by: contacting a touch screen display such as 318 on or near the region the control is displayed on; moving a pointing device such as a mouse or trackpad so a cursor is on/near the displayed control and clicking or otherwise selecting the control; providing a keyboard shortcut and detecting use of that keyboard shortcut; and/or other inputs.

By way of further example, input to enter text may be achieved by a hardware keyboard connected to system 210 and/or or a software keyboard displayed by a display of system 210 (which is manipulated by touch if the display is a touch screen display and/or pointing device inputs).

By way of still further example, user interaction to scroll through user interface elements (e.g. scrolling through scene previews 823) may be by interaction with a scroll bar or general user interface region using a pointing device (e.g. by clicking and dragging a scroll bar handle or a general display region), or touch screen (e.g. contacting a scroll bar handle and dragging it or generally swiping in a display region).

In the present disclosure, therefore, unless specified any appropriate user interaction may be used to interact with a user interface element.

The foregoing description also describes various scenarios in which one or more UI elements are visually distinguished from one or more other UI elements. For example, in FIG. 8 the selected element type control (e.g., any one of controls 812-819) is visually distinguished from the non-selected element type controls.

Generally speaking, various mechanism for visually distinguishing UI elements may be used. By way of example, one or more of the following techniques may be used: different line weights or types for UI element bounding boxes; use of colour vs greyscale display; use of contrasting colours (e.g. different colours, faded vs full colours); use of transparency/opacity; displaying additional text and/or images (e.g. icons or the like); and/or use of any other visual feature to distinguish one or more UI elements from one or more other UI elements.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Unless required by context, the terms "first", "second", etc. are used to differentiate between various elements and features and not in an ordinal sense. For example, a first user input could be termed a second user input, and, similarly, a second user input could be termed a first user input, without departing from the scope of the various described examples. By way of further example, in certain cases a second user input could occur before a first user input and/or without a first user input ever occurring.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer-implemented method comprising:

displaying, on a display, a visual production user interface including a timeline region, the timeline region including:

a scene timeline, the scene timeline including a time-ordered sequence of scene previews, each scene preview corresponding to a scene of two or more scenes of a visual production and having a display width that provides a visual indication of a duration of the corresponding scene;

an audio timeline including a waveform representation of an audio element associated with the visual production;

detecting selection of a first scene preview;

determining a zoom level of the timeline region at a first time;

in response to determining that the zoom level of the timeline region is above a threshold zoom level at the first time, activating snap regions in the scene timeline that correspond to positions of downbeats and non-downbeats in the audio element, wherein a non-downbeat is a beat in the audio element that is not a downbeat; and in response to determining that the zoom level of the timeline region is below the threshold zoom level at the first time, activating snap regions in the scene timeline that correspond to the positions of downbeats in the audio element without activating snap regions in the scene timeline that correspond to positions of non-downbeats.

2. The computer-implemented method of claim 1, wherein a width of each snap region is greater than a timing of a downbeat or non-downbeat associated with the corresponding snap region.

3. The computer-implemented method of claim 1, further comprising:

displaying downbeat markers and non-downbeat markers in the audio timeline if the zoom level of the timeline region is above the threshold zoom level, the downbeat and non-downbeat markers indicating positions of downbeats and non-downbeats respectively in the audio element; and displaying downbeat markers in the audio timeline without displaying non-downbeat markers if the zoom level of the timeline region is below the threshold zoom level.

4. The computer-implemented method of claim 3, wherein the downbeat markers are visually distinguishable from the non-downbeat markers.

5. The computer-implemented method of claim 1, wherein each scene preview in the scene timeline includes at least one handle, the handle being selectable and draggable to increase or decrease the display width of the corresponding scene preview.

6. The computer-implemented method of claim 5, wherein detecting selection of the first scene preview comprises detecting selection of a handle of the first scene preview.

7. The computer-implemented method of claim 1, further comprising:

accessing production data in respect of the visual production, the production data including scene data defining the two or more scenes of the visual production, the scene data of each scene comprising at least a duration of the corresponding scene.

8. The computer-implemented method of claim 1, wherein the first scene preview includes a handle and the method further comprises:

detecting dragging of the handle of the first scene preview within the scene timeline, wherein the dragging of the handle causes the display width of the scene preview to increase or decrease depending on a direction of the dragging;

detecting position of the handle above a first snap region; and locking a position of the handle to a timing of a downbeat or non-downbeat that is associated with the first snap region.

9. The computer-implemented method of claim 8, wherein locking the position of the handle to the timing of the downbeat or non-downbeat associated with the first snap region comprises providing visual or haptic feedback.

10. The computer-implemented method of claim 9, wherein the visual feedback is a bounce animation of the downbeat or non-downbeat marker associated with the downbeat or non-downbeat.

11. The computer-implemented method of claim 8, further comprising:

detecting a drop of the handle in the first snap region; and updating scene data associated with the first scene preview, wherein updating the scene data comprises updating a duration of the scene based on the width of the scene preview at the time of detecting the drop.

12. The computer-implemented method of claim 8, further comprising:

detecting dragging of the handle of the first scene preview outside the first snap region; and unlocking the position of the handle from the timing of the downbeat or non-downbeat that is associated with the first snap region.

13. The computer-implemented method of claim 12, wherein unlocking the position of the handle from the timing of the downbeat or non-downbeat associated with the first snap region comprises providing visual or haptic feedback.

14. The computer-implemented method of claim 12, further comprising:

detecting a drop of the handle outside the first snap region; and updating scene data associated with the first scene preview, wherein updating the scene data comprises updating a duration of the scene based on the width of the scene preview at the time of detecting the drop.

15. The computer-implemented method of claim 11, further comprising:

deactivating the snap regions upon detecting the drop of the handle.

16. The computer-implemented method of claim 1, further comprising:

determining the zoom level of the timeline region at a second time after the first time;

in response to determining that the zoom level of the timeline region is above the threshold zoom level at the second time but was below the threshold zoom level at the first time, activating additional snap regions corresponding to non-downbeats in the audio timeline; and in response to determining that the zoom level of the timeline region is below the threshold zoom level at the second time but was above the threshold zoom level at the first time, deactivating snap regions corresponding to non-downbeats in the audio timeline.

17. The computer-implemented method of claim 1, further comprising:

determining whether beat metadata exists for an audio track associated with the audio element, the beat metadata including data indicating a timing of each beat in the audio track and whether each beat is a downbeat or non-downbeat; and retrieving the beat metadata for the audio track upon determining that the beat metadata exists for the audio track.

18. The computer-implemented method of claim 1, further comprising:

determining whether beat metadata exists for an audio track associated with the audio element, the beat metadata including data indicating a timing of each beat in the audio track and whether each beat is a downbeat or non-downbeat;

upon determining that beat metadata does not exist for the audio track requesting generation of the beat metadata; and receiving the generated beat metadata.

19. The computer-implemented method of claim 17, further comprising:

inspecting the beat metadata to determine the timing of downbeats and non-downbeats in the audio element; and displaying the downbeat markers and/or non-downbeat markers at positions in the audio timeline based on the determined timing.

20. A computer processing system including:

a display;

one or more processing units; and one or more non-transitory computer-readable storage media storing instructions, which when executed by the one or more processing units, cause the one or more processing units to:

display, on the display, the visual production user interface including a timeline region, the timeline region including:

a scene timeline, the scene timeline including a time-ordered sequence of scene previews, each scene preview corresponding to a scene of two or more scenes of a visual production and having a display width that provides a visual indication of a duration of the corresponding scene;

an audio timeline including a waveform representation of an audio element associated with the visual production;

detecting selection of a first scene preview;

determine a zoom level of the timeline region at a first time;

in response to determining that the zoom level of the timeline region is above a threshold zoom level at the first time, activate snap regions in the scene timeline that correspond to positions of downbeats and non-downbeats in the audio element, wherein a non-downbeat is a beat in the audio element that is not a downbeat; and in response to determining that the zoom level of the timeline region is below the threshold zoom level at the first time, activate snap regions in the scene timeline that correspond to the positions of downbeats in the audio element without activating snap regions in the scene timeline that correspond to positions of non-downbeats.

21. One or more non-transitory storage media storing instructions executable by one or more processing units to cause the one or more processing units to:

display, on a display, a visual production user interface including a timeline region, the timeline region including:

a scene timeline, the scene timeline including a time-ordered sequence of scene previews, each scene preview corresponding to a scene of two or more scenes of a visual production and having a display width that provides a visual indication of a duration of the corresponding scene;

an audio timeline including a waveform representation of an audio element associated with the visual production;

detect selection of a first scene preview;

determine a zoom level of the timeline region at a first time;

in response to determining that the zoom level of the timeline region is above a threshold zoom level at the first time, activate snap regions in the scene timeline that correspond to positions of downbeats and non-downbeats in the audio element, wherein a non-downbeat is a beat in the audio element that is not a downbeat; and in response to determining that the zoom level of the timeline region is below the threshold zoom level at the first time, activate snap regions in the scene timeline that correspond to the positions of downbeats in the audio element without activating snap regions in the scene timeline that correspond to positions of non-downbeats.

* * * * *